United States Patent [19]

Nakano et al.

[11] Patent Number: 4,538,893
[45] Date of Patent: Sep. 3, 1985

[54] MOTOR DRIVEN CAMERA

[75] Inventors: Yoshiyuki Nakano; Osamu Maida, both of Tokyo, Japan

[73] Assignee: Nippon Kogaku K.K., Tokyo, Japan

[21] Appl. No.: 497,830

[22] Filed: May 25, 1983

[30] Foreign Application Priority Data

Jun. 1, 1982 [JP] Japan .................................. 57-93401

[51] Int. Cl.³ .................... G03B 1/18; G03B 7/085; G03B 19/12
[52] U.S. Cl. ..................................... 354/412; 354/448; 354/152; 354/173.11; 354/271.1
[58] Field of Search ............... 354/412, 451, 452, 453, 354/173.1, 173.11, 204–206, 213, 214, 448, 271.1, 152, 446

[56] References Cited

U.S. PATENT DOCUMENTS

| | | | |
|---|---|---|---|
| 3,827,067 | 7/1974 | Yamamichi | 354/173.1 |
| 3,840,884 | 10/1974 | Umeda | 354/173.1 |
| 3,868,702 | 2/1975 | Strauss et al. | 354/451 |
| 3,909,835 | 9/1975 | Ito et al. | 354/204 |
| 4,294,527 | 10/1981 | Hashimoto et al. | 354/173.1 X |
| 4,396,271 | 8/1983 | Hiraike | 354/271.1 |
| 4,416,525 | 11/1983 | Chan | 354/173.1 |
| 4,441,800 | 4/1984 | Nakano | 354/271.1 X |

Primary Examiner—William B. Perkey
Attorney, Agent, or Firm—Fitzpatrick, Cella, Harper & Scinto

[57] ABSTRACT

In a camera having a stop drive mechanism adapted to be driven by an electric motor to vary a stop aperture and a film wind-up mechanism adapted to be driven by the electric motor to wind up a film, the electric motor is rotated to drive the stop drive mechanism before exposure of the film, and it is also rotated to drive the film wind-up mechanism after the exposure of the film. The rotating speeds of the electric motor in the first rotation to drive the stop drive mechanism and in the second rotation to drive the film wind-up mechanism are independently variable.

19 Claims, 13 Drawing Figures

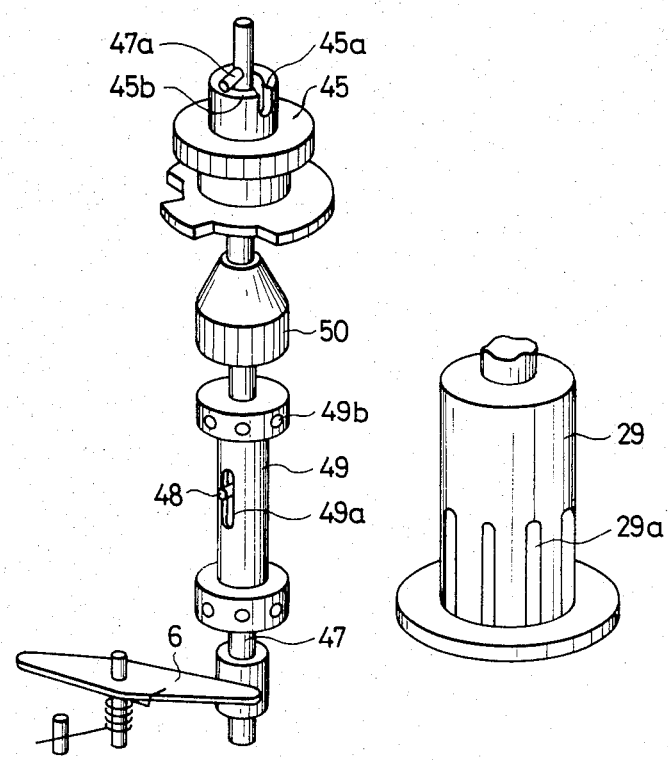
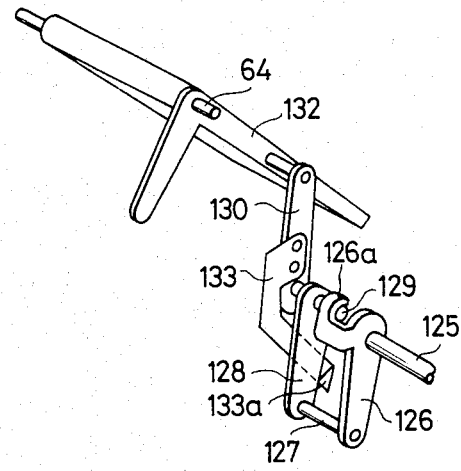
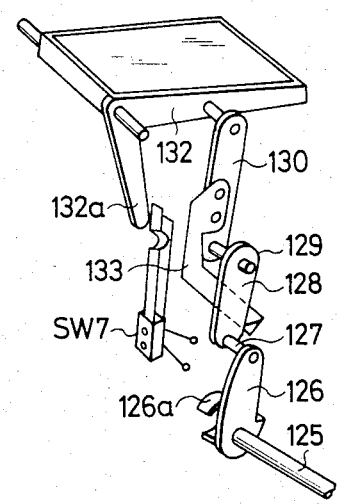
FIG. 2
FIG. 3
FIG. 4

MOTOR DRIVEN CAMERA

BACKGROUND OF THE INVENTION

1. Field of the Invention

The present invention relates to a motor driven camera in which a plurality of mechanisms in the camera are driven by a motor.

2. Description of the Prior Art

In a modern motor driven camera, there is a tendency to use a motor direct drive system not only to wind up a film but also to drive a mirror, a stop and charge a shutter, because the direct drive system is superior with respect to efficiency and simplification of construction, to an indirect drive system in which a spring is charged by an electric motor and a charge of the spring is used to drive the mechanisms.

However, when it is desired with such a camera to change a time required to one frame photographing by changing a rotating speed of the motor, the following problem is encountered.

In a camera which directly drives a member for determining a stop aperture by the motor, a displacement speed of the member changes as the motor rotating speed changes. The aperture determining member is latched by a latch mechanism when it reaches a position corresponding to a desired stop aperture in the course of displacement from a position corresponding to a maximum stop aperture to a position corresponding to a minimum stop aperture prior to shutter operation. As the displacement speed of the aperture determining member increases, it becomes difficult to accurately stop the member at the desired position and hence an error occurs in the stop control.

In a single lens reflex type motor driven camera which directly drives a mirror drive system by the motor, as the motor rotating speed increases, a mirror reciprocating speed also increases. As a result, a shock caused when the mirror is raised and stopped at a photographing position increases. This causes a vibration of the camera and results in a low quality picture.

In a camera which directly drives mechanisms which are driven during the time period between the depression of a release button and the start of run of the shutter (stop drive system, mirror drive system, auto-focusing lens drive system, etc.) by the motor, as the motor rotating speed changes, a start timing of the exposure of the film also changes. That is, the time period from the depression of the release button to the start of the run of the shutter changes. As a result, a user cannot determine the exposure timing and hence a picture which is different from an intended one is produced.

SUMMARY OF THE INVENTION

It is an object of the present invention to provide an improved camera which drives a plurality of mechanisms mounted in the camera by one or more electric motors.

In one aspect of the present invention, there is provided a motor driven camera having a speed changing device which allows change of operation time of at least one of the plurality of mechanisms independently from other mechanisms.

For example, by extending the operation time of the stop control mechanism or the mirror drive mechanism independently from other mechanism by the speed changing device, the precision of the stop control is improved or the shock to the camera is relieved without extending the operation times of other mechanisms.

In another aspect of the present invention, there is provided a motor driven camera having a mode selection device which selectively lowers the drive speed of the wind-up mechanism after the exposure. Thus, low noise photographing is attained.

It is another object of the present invention to provide an improved motor driven camera which drives a film wind-up mechanism in the camera device by an electric motor.

In one aspect of the present invention, the drive of the wind-up mechanism is controlled in association with a rear cover which opens a film chamber to allow loading of a film in the camera. When the rear cover is in an open position, the wind-up mechanism is controlled such that a predetermined amount of wind-up necessary to positively couple the film to a wind-up spool is assured, and when the rear cover is in a closed position, the wind-up mechanism is controlled such that a predetermined amount of wind-up necessary to completely wind up a leading edge of the film is assured.

It is a further object of the present invention to provide an improved motor driven camera which enables multi-exposure photographing.

BRIEF DESCRIPTION OF THE DRAWINGS

FIG. 2 is a schematic perspective view of a sprocket mechanism of FIG. 1, FIG. 3 is a schematic perspective view of a mirror mechanism of FIG. 1, FIG. 4 is a schematic perspective view illustrating a mirror raised position.

DETAILED DESCRIPTION OF THE PREFERRED EMBODIMENTS

Figure 1:
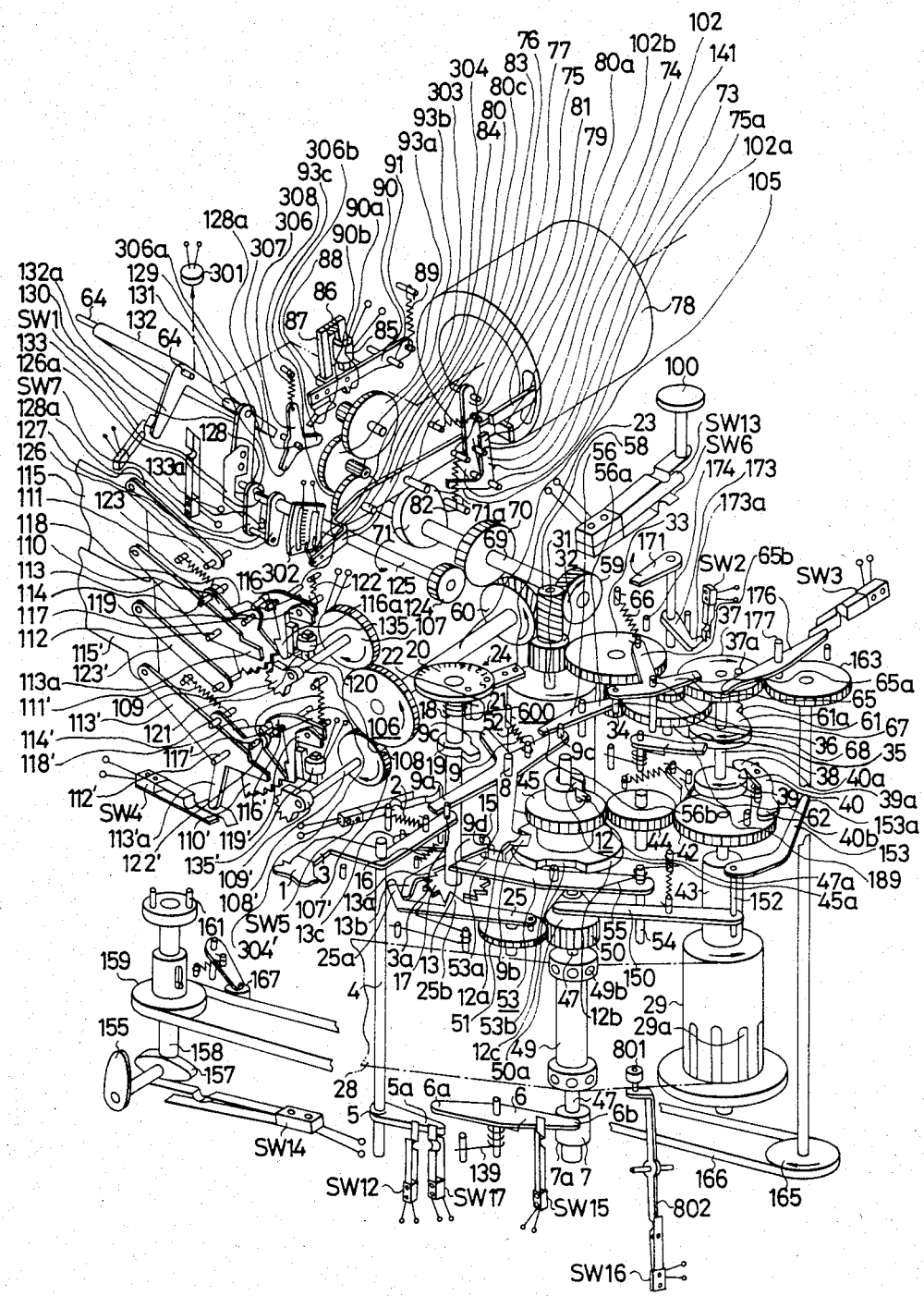
FIG. 1 is a schematic perspective view of a drive mechanism in one embodiment of a camera of the present invention.

FIG. 1 shows one embodiment of the present invention and shows a camera mechanism.

Details of the respective elements are now explained in the sequence of photographing preparation operation.

First, in order to load a film 28, a latch which latches a camera rear cover is unlatched by known means. Thus, the rear cover is released and a portion 1 of the rear cover is moved left-downward as viewed in FIG. 1.

A lever 3 is rotated leftward (counter-clockwise direction) to follow the portion 1 of the rear cover around a shaft 4 by a biasing force of a spring 2. As a result, a lever 5 fixed to a lower portion of the shaft 5 is also rotated leftward and it pushes an end 6a of a holding lever 6. As a result, the lever 6 is rotated rightward (clockwise direction) and a rewind condition is released. Thus, the lever 6 and a rewind button 7 which has been in a raised position are brought into a positional relation as shown. The rewind condition and the release thereof will be explained later.

As the lever 5 is rotated leftward, an end 5a thereof is released from the abutment to switches SW12 and SW17 so that the switch SW12 is turned off and the switch SW10 is turned on. As a result, even in the open position of the rear cover, a motor 600 can be rotated to drive a spool 29 and a sprocket 49. This operation will be described later.

A pin 3a is mounted at the other end of the lever 3. As the lever 3 is rotated leftward, the pin 3a pushes one arm 9a of a wind-up limit lever 9 which rotates around a shaft 8 to rotate the lever 9 leftward. A wind-up limit switch SW5 is arranged behind the arm 9a and it is turned on as the lever 9 is rotated rightward. The switch SW5 is connected to a motor control circuit to be described later which causes the motor 600 to rotate in the opposite direction to an arrow shown at a time when a switch SW6 at the top of FIG. 1 is turned on when the switch SW5 is on. When the lever 9 is rotated rightward, a hook 9b at an end of another arm is retracted from a notch 12a of a wind-up limit plate 12 so that the wind-up limit plate 12 is rendered rotatable.

When the lever 3 is rotated leftward, a pawl 13 which latches a film counter 20 is rotated rightward around a shaft 15 through a pin 13c against a biasing force of a spring 16. As a result, an engagement 13a is disengaged from a ratchet wheel 17 fixed to a bottom end of a shaft 18. Thus, the ratchet wheel 17, the shaft 18, a cam 19 fixed to the shaft 18 and the film counter 20 are rotated leftward in union by a biasing force of a spring 21. The rotation is terminated when a pin 22, mounted at a lower portion of the film counter 20, abuts against a stopper 23 mounted on a base plate not shown. At this time, a letter "S" on the film counter 20 faces an index 24 to indicate a reset condition of the film counter 20.

An end 25a of another feed pawl 25 which engages with the ratchet wheel 17 is pushed by the end 13a of the pawl 13 and retracted from the engaging position. Thus far, the operation when the rear cover is opened has been described. After the rear cover has been opened, the film is loaded. During this period, the motor 600 is not rotated.

The operation from the loading of the film to the preparation of the photographing of a first frame, that is, the wind-up operation of a leading edge of the film by the film feed system is now explained. An end of the film 28 is inserted into a groove 29a of the spool 29 and a push button 100 is depressed. Thus, a switch SW13 and the switch SW6 are turned on. Since the switch SW5 is already on at this time, the motor 600 starts to rotate oppositely to the arrow shown as described above. As a result, gears 33, 59 and 60 are rotated oppositely to the arrow through a pinion 32 and a worm 58 fixed to a shaft 31 of the motor 600. As the pinion 32 rotates, a gear 37 is rotated oppositely to the arrow through reduction gears 33, 34, 35 and 36. The reduction gears serve to produce a torque necessary to feed the film from the small size motor 600.

A film feed disc 39 at the bottom of a shaft 39 to which the gear 37 is fixed has a pawl 39a which engages with a hook 40a of a pawl 40 and rotates a gear 42 together with the pawl 40 in the same direction. Thus, the spool 29 is rotated in the direction of the arrow shown through a known spool friction mechanism 43 and the film 28 is wound up on the spool 29.

On the other hand, the rotation of the gear 42 is transmitted to a gear 45 through a gear 44, but the rotation of the gear 45 is not directly transmitted to a sprocket shaft 47. This is explained with reference to FIG. 2. As described above, the rewind condition is released by the rightward rotation of the lever 6, but at the end of rewinding of the film used in the previous photographing, the phase of a pin 47a mounted at the top of the sprocket shaft 47 usually does not coincide with the phase of a groove 45a formed in the gear 45. Thus, the shaft 47 and the sprocket 49 which is rotationally coupled to the shaft 47 by a pin 48 on the shaft 47 and a groove 49a are independent from the gear 45. The sprocket 49 is rotated when perforations of the film 28, which is moved as the film 28 is wound on the spool 29, mesh with teeth 49b of the sprocket 49, and hence the shaft 47 is also rotated.

As is known, when the mechanisms are driven by a single drive source, design is such that the spool 29 winds up more of the film 28 than the sprocket 49. Therefore, as the film 28 is moved, it is usual that the phase of the pin 47a and the phase of the groove 45a coincide at a certain time point and engage with each other so that the feed amount of the film 28 is determined by the rotation of the gear 45. This is also true for the present embodiment.

A gear 50 coupled to a gear 51 is fixed to the shaft 47. The pawl 25 is coupled to an eccentric position on the gear 51 so that it is reciprocated as the gear 51 rotates. As the sprocket 49 winds up the film 28 frame by frame, the ratchet wheel 17 is rotated one tooth at a time through the gear 51 and the pawl 25. As a result, as the film is fed, the film counter 20 is rotated such that a letter "1" faces the index 24.

The cam 19 fixed to a shaft 18 prevents the counterclockwise rotation of the lever 9 and retracts the hook 9b from the outer periphery of the wind up limit plate 12 until the film counter 20 indicates "1". Immediately before the film counter 20 indicates "1", the film feed is mechanically stopped. At this time, the switch SW5 which has been pushed by the arm 9a of the lever 9 is turned off and the motor 600 is deenergized by an action of a control circuit 185 to be described later. Thus, the wind-up of the leader of the film is terminated.

A holding lever 53 is biased rightward around a shaft 54 by a spring 55, and only when a pin 53b mounted on the holding lever 53 abuts against a recess 12c formed on an outer periphery of the limit plate 12, an end 53a can engage with an end 9d of the lever 9 at a position displaced from the limit plate 12.

As described above, the lever 9 is disengaged from the limit plate 12 when the rear cover is opened, and it is rotated by an action of a lever 56 to be described later to be displaced from the limit plate 12.

During the wind-up of the film leader, a stop 79, a leading shutter curtain 115 and a trailing shutter curtain 115' of the shutter and a quick-return mirror held on a support frame 132 are not driven. Those will be described later.

The photographing operation and the following wind-up operation are now explained.

When the push button 100 is again depressed, the first stage switch SW13 is turned on. As a result, a portion of a circuit to be described later is energized.

A light transmitted through a lens 78 is reflected by a quick-return mirror held on the support frame 132 and directed to a photosensitive element 301. An output from the photosensitive element 301 is supplied to an exposure control circuit where it is processed. When the push button 100 is depressed further, the second stage switch SW6 is turned on and the light measurement result by the photosensitive element 301 is stored in the exposure control circuit.

When the switch SW6 is turned on, the following further operations are also started. Since the switch SW5 is off at this time, the motor 600 starts to rotate in the direction of the arrow by the action of the motor control circuit. Accordingly, the pinion 32 and the worm 58 are rotated and the gears 33, 39 and 60 are rotated in the direction of the arrow.

By the rotation in the direction of the arrow, the film feed system which is linked to the pinion 32 and the gear 33 is driven in the following manner. The rotation of the motor shaft 31 is converted to appropriate rotating speed and torque by the reduction gears so that the elements 32–39 and 61 are rotated in the direction of the arrow. When the limit plate 61 rotates rightward by a predetermined angle, a latching pawl 62 which contacts the outer periphery of the rotation limit plate 61 latches an engagement 61a to prevent the rotation of the limit plate 61. As a result, it serves as a stopper for the stop drive system, the mirror drive system and the shutter charge system to be described later. The rotation of the disc 39 in the direction of the arrow is not transmitted to the pawl 40. Accordingly, the gear 42 and the following elements are not rotated and the film is not fed.

The stop drive system which is linked to the worm 58 and the gear 59 is driven in the following manner. As the motor 600 is rotated, the gear 59, the shaft 69, the gear 70 and the cam 71 are rotated in union in the direction of the arrow. The rotation continues until the pawl 62 prevents the rotation of the rotation limit plate 61. At an early stage of the rotation of the cam 71, an end 71a thereof rotates an end 102a of a lever 102 counterclockwise but the lever 102 does not rotate around a shaft 73 mounted on a holding lever 75 and an arm 102b of the lever 102 abuts against a pin 74 mounted on the lever 75 and is rotated leftward in union with the lever 75 around a shaft 77.

In the present embodiment, the lever 79 which is linked to the stop mechanism of the lens 78 is biased downward as seen in FIG. 1. The downward movement of the lever 79 is prevented by an end 80a of a limit lever 80 so that the stop is fully opened. When the pin 81 held by a hook 75a is released by the leftward rotation of the holding lever 75, the lever 80 is rotated rightward around a shaft 84 in a direction to cause the end 80a thereby to descend and to follow the cam 71 due to the forces of the lever 79 and a spring 82. Thus, the aperture is stopped down.

The amount of reduction of the stop aperture is measured by a resistor 302 and a brush 303 mounted at an end 80c of the lever 80. When the measurement result reaches an appropriate value determined by a preset shutter speed and a film sensitivity, a coil 85 is energized by an action of the exposure control circuit to be described later. Thus, an armature 88 which has been attached to a yoke 87 by a permanent magnet 86 is rotated leftward around a shaft 91 together with a latch pawl 90 against the biasing force of the spring 89. Since a pawl 90a of the latch pawl 90 engages with speed-up gears including gears 93a, 93b and 93c, the limit lever 80 which is in union with the gear 93c is stopped and an aperture value for a proper exposure is set. The speed-up gears 93a, 93b and 93c serve to improve a resolution in setting the stop aperture.

The shutter charge system which is linked to the worm 58 and the gear 60 is driven in the following manner.

As the motor 600 is rotated, the gears 59 and 60, a shaft 105 and gears 106, 107 and 107' are rotated in the direction of the arrow. As the gear 107 is rotated, a leading shutter curtain charge gear 109 is rotated and meshed with a sector gear. While the meshed condition continues for a certain period, the gear 110 is rotated leftward around a shaft 112, and when the gear 109 faces a non-toothed area of the gear 110, the gears 109 and 110 are disengaged and thereafter only the gear 109 continues to rotate rightward. The rightward rotation of the gear 109 is stopped when the rotation limit plate 61 of the film feed system engages with the pawl 62.

On the other hand, the secter gear 110 which was disengaged from the charge gear 109 is returned to a position shown in FIG. 1 by a biasing force of a spring 111. During the counterclockwise rotation of the sector gear which follows the gear 109, the pin 114 causes a leading shutter curtain arm 113 to rotate around the shaft 112. A pin 117 is mounted on the sector gear 110 and it pushes a spring 118 as the gear 110 is rotated leftward. A pawl 116 is rotated rightward by the biasing force of the spring 118 to urge an armature 119 mounted on the pawl 116 to a yoke 120. Thereafter, the yoke 120 and the armature 119 are held in the attracted position by a force of attraction of a permanent magnet 121 against a biasing force of a spring 122. A hook 116a of the pawl 116 and a latch 113a of the arm 113 are kept in engagement against a leading shutter curtain drive spring not shown. Thus, the preparation for the leading shutter curtain drive operation is completed. An auxiliary arm 123 serves to support the leading shutter curtain 115 together with the arm 113.

As to the trailing shutter curtain, the gear 107' is rotated in the direction of the arrow of FIG. 1 to complete the preparation for the trailing shutter curtain drive operation.

The above operation is one example of a known shutter charge operation. The shutter charge operation is primarily effected while the stop aperture is stopped down. Thus, the shutter charge operation serves to reduce the speed in order to attain the stop control precisely.

In the course of stopping down the stop aperture, a gear 70 and a gear 124 always mesh and a shaft 125 continues to rotate. The shaft 125 drives a reflex mirror.

As the shaft 125 is rotated leftward, an arm 126 and a shaft 127 mounted at an end of the arm 126 are rotated, and an end 128a of an arm 128 rotatably mounted on the shaft 127 is moved rightward. As the end 128a is moved rightward, a pawl 133a at an end of a leaf spring 133 fixed to an arm 130 engages with the arm 128 as shown in FIG. 3. Thus, the arm 128 and the arm 130 are engaged and thereafter they act as one arm. It serves as a rod, the arm 126 serves as a crank which rotates around the shaft 125 and the shaft 127 serves as a crank pin to push up a frame 132. Since an enclosure 126a has an opening, the movement of a shaft 129 is not impeded. The frame 132 starts to rotate leftward around a shaft 64 and soon after the arm 132a which is in union with the frame 132 is disengaged from a switch SW1 so that the switch SW1 is turned off during the leftward rotation of the shaft 125. As explained above, the shutter charge operation is carried out during this period.

The switch SW1 is turned off after a switch SW4 has been turned off by a projection 113′a of an arm 113′ which is rotated counterclockwise by the shutter charge operation.

In the crank mechanism described above, a gear ratio of the gears 70 and 124 is selected such that the arm 126 is substantially in line with the arms 128 and 130 when the shaft 125 is rotated leftward by one half of revolution. This is the time when the rotation limit plate 61 of the film feed system and the pawl 62 engage.

A condition when the mirror has been raised is shown in FIG. 4. Under this condition, an arm 132a which is in union with the frame 132 turns on a mirror stop switch SW7 near the end of rising of the frame 132. Thus the motor 600 is stopped by the action of the control circuit. The motor 600 is provided with a known slip mechanism not shown so that it slips when the rotation is stopped by an external force.

In this manner, the stop aperture is stopped down from the full open position to a desired position, the shutter is charged and the reflex mirror is retracted from the optical path so that the exposure operation by the shutter is ready.

When a coil 135 is energized at an appropriate time, a force of attraction of a permanent magnet 136 is temporarily reduced and the attraction of the armature 119 and the yoke 120 is released by a biasing force of a spring 137 and the pawl 16 is rotated leftward and the hook 116a releases the engagement with the latch 113a of the arm 113. Thus, the leading shutter curtain 115 is moved by a force of a leading shutter curtain drive spring not shown. Then, a coil 135′ is energized at a time when a preset shutter speed is obtained. Thus, a trailing shutter curtain 115′ is driven in the same manner as the leading shutter curtain. Near the beginning or the end of the drive of the trailing shutter curtain, the switch SW4 which has been off in the charge condition is turned on because it abuts against the projection 113′a of the arm 113′.

As a result, the motor 600 is rotated reversely immediately or with an appropriate time lag by the action of the control circuit to be described later. Thus, the mirror is returned, the stop aperture is fully opened and the respective elements assume the positions shown in FIG. 1.

As the motor is rotated reversely, the arm 126 is rotated clockwise and the arms 128 and 130 and the frame 132 descend from the positions shown in FIG. 4. When the arm 126 is oriented downward, the enclosure 126a abuts against the shaft 129 and they are on the same axis. Thus, the positions of FIG. 3 is restored and the frame 132 is prevented from moving.

Whatever times of revolution the shaft 125 makes under this condition, the arms 126 and 128 merely rotate around the shafts 125 and 129 through the pin 127, and the arm 130 is not displaced and the holding frame 132 is not moved.

As the holding frame 132 descends, the switch SW7 is turned off and the switch SW1 is turned on.

At an early stage of the return operation of the mirror, the pin 127 abuts against an end 306a of a reset lever 306 to rotate the lever 306 leftward around a shaft 307 against a biasing force of a spring 308. Thus, another arm 306b of the lever 306 is moved upward so that the armature 88 is attracted to the yoke 87. As a result, the engagement of the latch 90a and the gear 93a is released and the gear is permitted to rotate.

As the motor 600 rotates reversely, the stopping cam 171 is rotated leftward. The cam 71 has a constant lift area. After the engagement of the latch 90a and the gear 93a has been released, the amount of lift is gradually increased. Thus, the pin is pushed upward and the lever 80 is rotated leftward to raise the lever 79. As a result, the stop aperture of the lens 78 is fully opened. As the lever 80 is rotated leftward, the aperture holding lever 75 is rotated rightward by the biasing force of the spring 76 and the hook 75a engages with the pin 81 so that the full open position of the stop aperture is maintained. As the cam 71 is rotated leftward the end 71a thereof raises the end 102a of the hold release lever 102, but the lever 102 is merely rotated rightward against a spring 141 and the lever 75 is not rotated leftward. Accordingly, whatever times of leftward revolution the cam 71 makes, the stop is kept in the full open position.

In this manner, the motor 600 is rotated reversely after the exposure to rotate the shaft 69 reversely so that the mirror is returned to the photographing optical path and the stop is returned to the full open position. The motor 600 can continue the reverse rotation while the above conditions are kept.

The operation of the shutter charge system during this period is now explained. As the motor 600 is rotated reversely after the exposure, the gear 60 starts to be rotated reversely. Thus, the charge gear 109 is rotated leftward and engages with the sector gear 110 to rotate the gear 110 rightward against the force of the spring 111. However, since a pin 114 mounted on the gear 110 goes away from the arm 113, the arm 113 is not moved. Similarly, the arm 113′ is not also moved.

Thereafter, the charge gear 109 is disengaged from the sector gear 110 and the sector gear 110 is rotated leftward by the biasing force of the spring 111 so that it returns to the position shown. Similarly, the sector gear 110 is rotated leftward by the force of the spring 111′ after the rightward rotation and returns to the position shown. Thus, in the shutter charge system, whatever times of revolution the motor 600 makes after the exposure, the conditions are not affected.

The operation of the film feed system is next explained. As the motor 600 and the pinion 32 are rotated reversely after the exposure, the gear 37 is rotated leftward through the reduction gears. A pin 37a mounted on the gear 37 is moved accordingly to push an arm 65a of a lever 65 so that the lever 65 is rotated rightward.

As a result, a pin 68 mounted at the other end of the lever 65 pushes an arm 56a of the lever 56 so that the lever 9 is rotated rightward by the lever 56 and the engagement of the hook 9b at the end of the lever 9 and the limit plate 12 is released and the limit plate 12 is permitted to rotate. Thus, the wind-up limitation is released by the rotation of the motor 600. At the same time, the end 9d of the lever 9 engages with the end 53a of the holding lever 53 so that the release condition is maintained.

As the gear 37 is rotated reversely, the rotation limit plate 61 starts to be rotated from the engagement position with the pawl 62 and the film feed disc 39 is also rotated reversely. When the projection 39a of the disc 39 engages with the hook 40a of the pawl 40 as shown in FIG. 1, the gear 42 starts to be rotated leftward. As the gear 42 is rotated, the spool 29 is rotated in the direction of the arrow through the friction mechanism 43. The rotation of the gear 42 is transmitted to the gears 44 and 45 and the sprocket shaft 47 is rotated leftward through the engagement of the groove 45a and the pin 46. Accordingly, the film 28 is fed.

Soon after the film feed has been started, the maximum diameter portion 12b of the limit plate 12 instead of the projected portion 12c abuts against the pin 53b. The lever 53 is rotated leftward around the shaft 54 to release the engagement with the end 9d of the lever 9. The lever 9 is rotated leftward by the force of the spring 52 and the hook 9b thereof abuts against the maximum diameter portion 12b of the limit plate 12. The end 9d limits the more than predetermined amount of rightward rotation of the lever 53 to prevent the pin 53b from fitting into the notch 12a.

As the limit plate 12 is rotated to bring the notch 12a to the position to face the hook 9b of the lever 9, they engage to prevent the rotation of the limit plate 12 so that further wind-up is inhibited. Thus, the one-frame wind-up of the film is completed. At the same time, the switch SW5 is turned off and the reverse of the motor 600 is stopped by the motor control circuit.

During this period, the gears 50 and 51 are continuously rotated by the sprocket shaft 47 so that the film counter 20 is advanced by one scale. During the film feed, the stop drive system, the shutter charge system and the mirror drive system are idling.

When the push button 100 is again depressed to photograph, the above sequence is repeated.

When the photographing of one roll of film is completed, the rewind button 7 is pushed upward to raise the sprocket shaft 47 which is normally biased downward. An end 6b of the holding lever 6 is inserted under a step 7a of the button 7 by a biasing force of a spring 139 to keep the shaft 47 at the raised position.

As the lever 6 is rotated leftward, a switch SW15 is turned off. The function of the switch SW15 will be described later.

As the shaft 47 is raised, the pin 47a escapes upward from the groove 45a of the gear 45 so that the sprocket 49 and the shaft 47 can rotate independently from the gear 45 and the gears 44 and 42 coupled thereto.

On the other hand, as the shaft 47 rises, the gear 50 is also raised and a lever 150 fixed to a shaft 152 by a conical portion 50a of the gear 50 rotates the shaft 152 and a lever 153.

When a cam 157 is rotated clockwise by approximately 90 degrees by a rewind lever 155, a shaft 158 is raised. The shaft 158 is rotationally coupled to a pulley 159 and has a rewind fork 161 at a top end. As the shaft 158 is raised, the fork 161 engages with a spool of a film magazine. As the cam 157 is rotated, a switch SW14 is pushed and turned on. As a result, the motor 600 starts to be rotated reversely by the control circuit and the film feed plate 39 is rotated leftward with the gear 42. The engagement of the feed plate 39 and the film feed pawl 40 is released as the button 7 is pushed up. When the entire film has been taken out of the magazine, the rewind button 7 is pushed up. An end 153a of the lever 153 is moved leftward. In most of normal conditions, the phase of the film wind-up operation is stopped at a position before one frame of film has been fully wound. Therefore, a projection 40b of the film feed pawl 40 is not always in a position to face the end 153a of the lever 153, but as the disc 39 is rotated leftward by the rewind operation, the projection 40b is pushed by the end 153a of the lever 153 within one revolution of the disc 39 so that the hook 40a is displaced rightward and the engagement with the projection 39a of the disc 39 is released.

As the gear 37 is rotated reversely, a shaft 164 and a pulley 165 are rotated in the direction of the arrow. A belt 166 is reeved around pulleys 165 and 158 with an appropriate tension given by a roller 167. Accordingly, the rotation of the pulley 165 is transmitted to the pulley 158 which rotates the shaft 159.

The sprocket 49 can freely rotate at this time and the spool 29 is permitted to rotate reversely by the slip of the friction mechanism 43 as is done in the known device. At the end of the film rewind operation, a roller 801 which has been rotating by the abutment to the film 28 is no longer pushed by the film 28. As a result, a switch SW16 pushes a lever 802 and is turned on.

Thus, the motor 600 is stopped by the control circuit.

Then, the rewind lever 155 is returned to the position shown in FIG. 1. Thus, the fork 161 descends and the switch SW14 is turned off. The gear 42 has an antireverse rotation pawl 189. In this manner, the rewind operation is completed.

The multi-exposure photographing operation is now explained. Since the camera is always stopped at the film feed completion state, a command for the multi-exposure is given before the first exposure. When a multi-exposure lever 171 is rotated clockwise, a lever 173 is rotated until it abuts against a pin 174. The lever 173 is held by a mechanism not shown at a position to push an arm 65b of the lever 65 leftward. As a result, the arm 65a is retracted from the engage position with the pin 37a mounted on the gear 37. Accordingly, the lever 9 is not rotated by the levers 65 and 56.

As the lever 173 is moved, a switch SW2 which has been on is turned off. The function of the switch SW2 will be explained later.

As the motor 600 is energized, the pin 37a mounted on the gear 37 is rotated leftward around a shaft 177 of a lever 176 so that a switch SW3 is turned on and the motor 600 is deenergized by the control circuit. It occurs before the disc 39 engages with the pawl 40. The switch SW5 is kept off. Thus, the first exposure is completed.

The second exposure is carried out by returning the lever 171 and returning the lever 65 and depressing the release button 100.

If a user forgets to return the lever 171 before the last exposure of the multi-exposure the film is not fed after the last exposure and the exposure is again made on the same frame.

Figure 5:
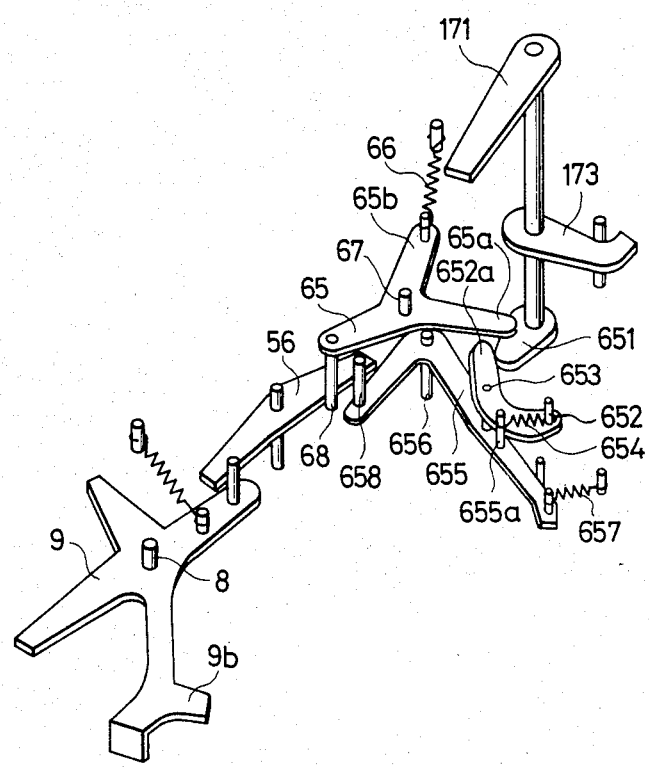
FIG. 5 is a schematic perspective view of a modification of a multi-exposure mechanism.

FIG. 5 shows a modification in which the return operation of the lever 171 is done after the last exposure of the multi-exposure.

A cam 651 is fixed at the bottom end of the lever 171. As the lever 171 is rotated, the cam 651 is rotated to ride over a lever 652 while it rotates a rocking lever 652 around a shaft 653. The lever 652 is returned to a position to couple to a pin 655a by a spring 654. During this period, the lever 173 rotates the lever 65 leftward to retract the arm 65a thereof from the rotation path of the pin 37a shown in FIG. 1. A biasing force of a spring 657 serves to prevent the movement of a lever 655 during the clockwise rotation of the cam 651.

After the last exposure of the multi-exposure, the lever 171 is returned and the cam 651 catches an end 652a of the lever 652 and pushed it to impart a clockwise moment to the lever 652 around the shaft 653. This moment is converted to a moment to a lever 655 around a shaft 656 through the engagement of the cam 651 and the pin 655a so that the lever 655 is rotated.

As a result, a pin 658 mounted on the lever 655 rotates the lever 56 and the lever 9.

The switch SW5 shown in FIG. 1 is turned on at this time and the film feed is started by the control circuit. The frame exposed is moved as the film 28 is wound on the spool 29 and the next unexposed frame is brought to face an aperture not shown.

Figure 6:
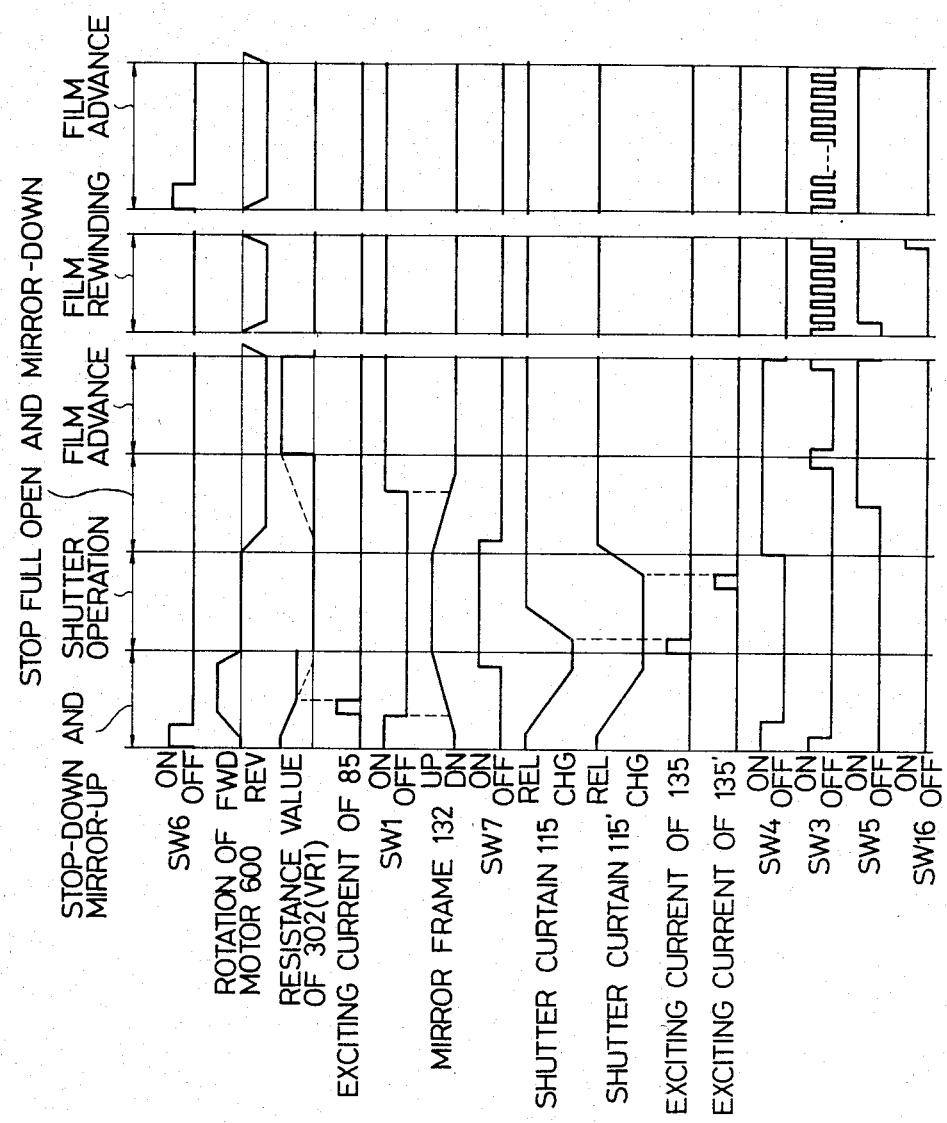
FIG. 6 is a chart of relations between the operation of the embodiment and switches for controlling the operation.

Now, the photographing sequence is summerized in accordance with a time chart shown in FIG. 6. When the film counter indicates "1", an object is decided and the switch SW6 is turned on. Then, the motor 600 is rotated forwardly and the stop drive system and the shutter charge system are activated so that the mirror holding frame 132 is raised from a viewing position to the photographing position. As the mirror is raised, the switch SW7 is turned on and the motor is stopped. Then, the leading curtain 115 and the trailing curtain 115' which have been charged for the exposure are driven and exciting currents to the magnets 135 and 135' are turned on.

When the drive of the trailing curtain is completed, the switch SW4 is turned on and the motor starts to be rotated reversely. As a result, the mirror descends and the stop is fully opened. The motor continues to be rotated reversely to drive the wind-up system so that the film is fed one frame. During this period, the drive system, the shutter charge system and the mirror drive system are not activated. The reverse rotation of the motor is stopped when the switch SW5 is turned off. After all of the frames have been exposed, the button 7 is depressed to release the engagement of the pin 47a and the groove 45a and disconnect the motor from the wind-up system, and the rewind coupling 161 is engaged with the film magazine. In the rewind operation, the switch SW14 in FIG. 1 is turned on to start the rewind operation and the motor is rotated reversely to store the exposed film in the magazine. When the wind-up is completed, the switch SW16 is turned on and the motor is stopped. In the multi-exposure operation, when the switch SW3 is turned on, the reverse rotation of the motor is stopped and the subsequent operation is blocked.

A silent mode or low speed mode in which the camera device is operated very silently is now explained.

Figure 7:
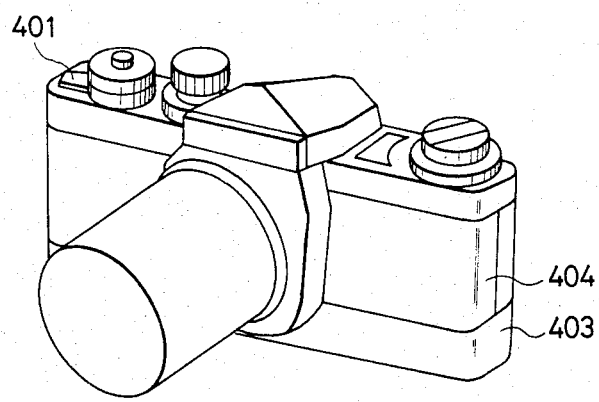
FIG. 7 is an outer view of the camera of the embodiment.
Figure 8:
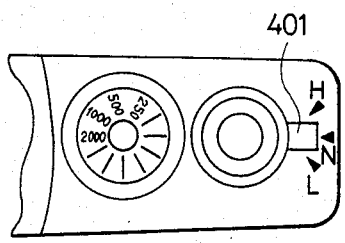
FIG. 8 is a partial plan view of FIG. 7.

FIG. 7 shows an external view of the camera. Numeral 401 denotes a lever of a speed selection switch. It can select one of three ranges H, N and L as shown in FIG. 8.

When the lever 401 is set to face to an index L, only the mirror return operation, the stop opening operation and the film feed operation are operated at a low speed. Thus, the times required for the stop control and the mirror drive are not changed and the user can exactly catch a shutter chance, and the precision of the stop control does not change. On the other hand, the noise after the photographing, which occupies most portions of the operation noise of the camera is extremely reduced.

The silent mode can also be applied to feed the film slowly in order to prevent breaking of the film when the camera is used in a very cold area.

Figure 9:
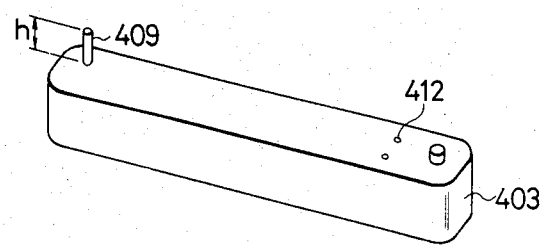
FIG. 9 is an example of a battery pack used in the embodiment.
Figure 10:
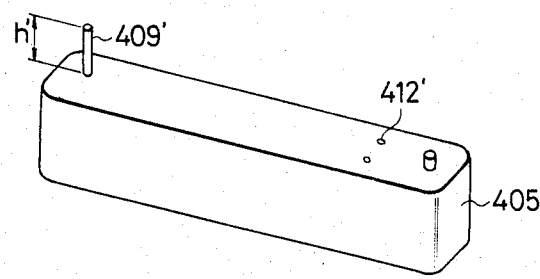
FIG. 10 is an example of a higher power battery pack.

When a battery pack 403 shown in FIG. 9 which is exchangeably attached to a camera body 404 is exchanged with a high power pack 405 shown in FIG. 10 which supplies a higher voltage, a contact arm 411 of a switch SW11 in the camera body is switched from a terminal 408 to a terminal 407. Because effective heights h of positioning reference pins 409 and 409' mounted on the packs 403 and 405 are different, they push or do not push an insulation member 411a at the end of the contact arm 411 when they are attached to the camera body.

Numerals 412 and 412' denote terminals for feeding the power to the camera.

When the switch SW11 is at a position shown in FIG. 11 and the lever 401 of FIG. 8 is switched to the position H, a switch in the camera to be described later is switched so that the mirror return operation, the stop opening operation and the film feed operation are carried out at a high speed.

Accordingly, the time required for one cycle of photographing operation can be reduced without changing the time required for the stop control operation and the mirror drive operation.

Figure 12:
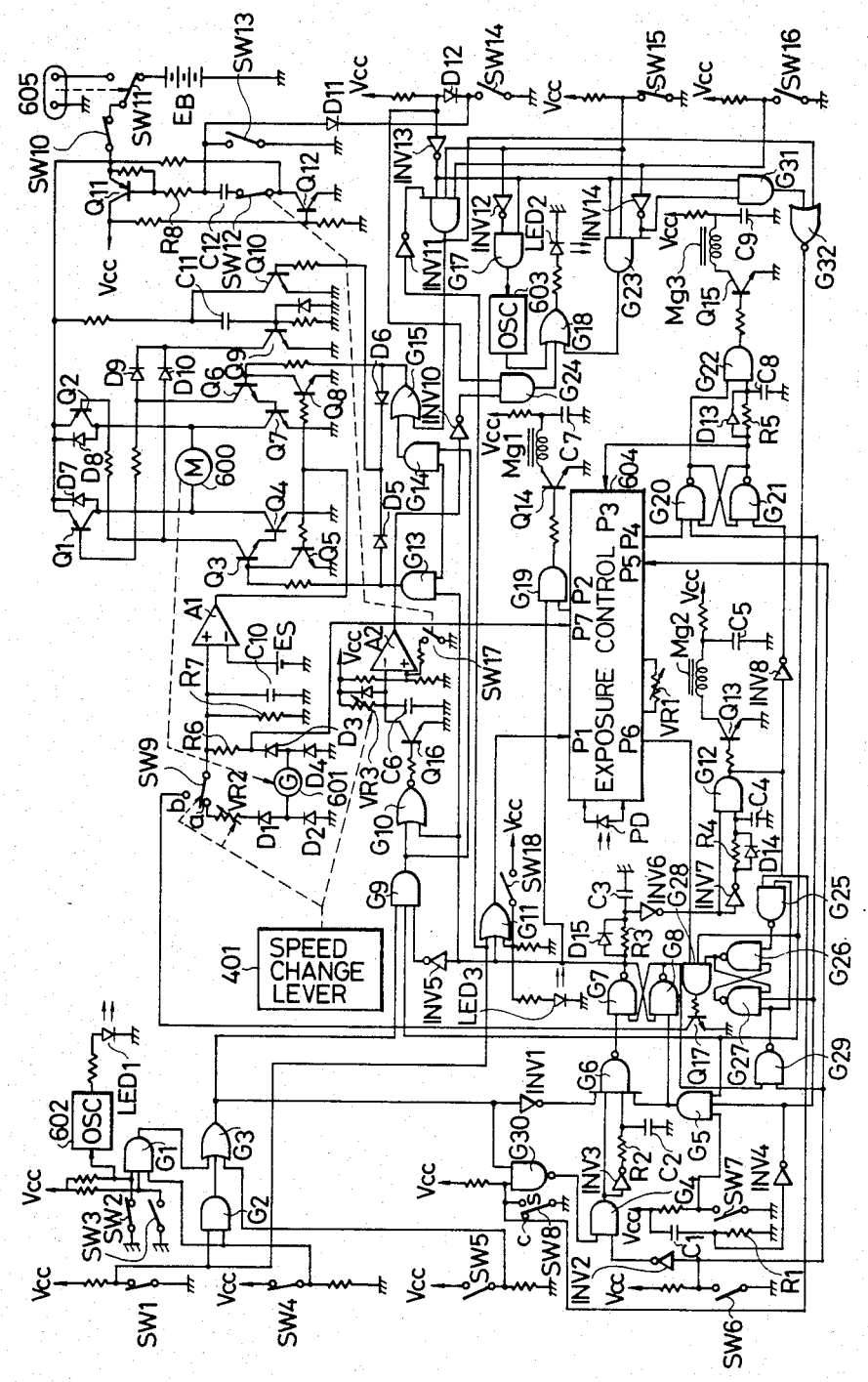
FIG. 12 is a circuit diagram of the embodiment.

FIG. 12 shows an embodiment of the circuit for controlling the mechanisms of FIG. 1. Switches SW1, SW2, SW3, SW4, SW5, SW6, SW7, SW13, SW14, SW15, SW16 and SW17 correspond to those shown in FIG. 1.

The switch SW8 is switched to a position S (on) when a selection lever, not shown, selects a one-frame photographing mode, and switched to a position C (off) when it selects a continuous photographing mode to control the one-frame photographing or the continuous photographing.

As shown in FIGS. 8 and 9, the switch SW9 is linked to the lever 401 of the speed selection switch so that a terminal a or a terminal b is selected. It selects the terminal b when the lever selects the maximum speed, and selects the terminal a in other cases. A variable resistor $VR_2$ for varying the motor speed and a variable resistor $VR_3$ for varying a detection time of a film end detection timer are also linked to the lever 401. The resistor $VR_2$ increases a resistance thereof as the lever selects the higher motor speed and the resistor $VR_3$ reduces a resistance thereof as the lever selects the higher motor speed.

The switch SW10 is a main power switch.

Figure 11:
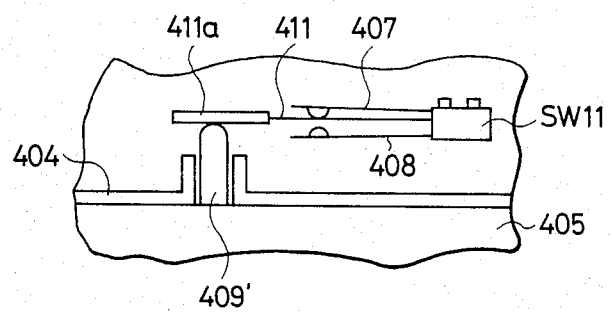
FIG. 11 is a switch which is switched depending on the battery packs of FIGS. 9 and 10.

The switch SW11 corresponds to the switch shown in FIG. 11. In the present embodiment, when an external connector is plugged into an external power supply connector 605 shown in FIG. 12, the switch SW11 is automatically switched to the connector 605.

A D.C. tachogenerator 601 not shown in FIG. 1 is coupled to the shaft of the motor 600. A polarity of the generated voltage changes depending on the direction of the rotation of the motor. When the motor 600 is rotated reversely, the output of the tachogenerator 601 is positive at a junction of diodes $D_1$ and $D_2$, and when the motor is rotated forwardly (in the direction of the arrow), the output is positive at a junction of diodes $D_3$ and $D_4$. At each polarity, the generated voltage is proportional to the rotating speed of the motor. Magnets $Mg_1$, $Mg_2$ and $Mg_3$ correspond to the magnet coils 85, 135 and 135' of FIG. 1, respectively. A variable resistor $VR_1$ corresponds to the potentiometer consisting of elements 302 and 303 of FIG. 1.

(1) Circuit operation in the film loading (1)-1 When the rear cover is open:

As explained before in connection with FIG. 1, the switch SW12 is off, the switch SW17 is on and the switch SW5 is on. Since the rewind lever 155 is at the normal position, the switch SW14 is off. It is assumed that the switch SW9 is connected to the terminal a.

When the push button 100 is depressed under this condition, the switch SW13 is turned on and a transistor $Q_{11}$ is rendered conductive through a resistor $R_8$ and the circuit is energized. In FIG. 12, those circuits which have no indication of a power line are energized through the transistor $Q_{11}$. As the transistor $Q_{11}$ is conductive, a transistor $Q_{12}$ is also conductive, but since the switch SW12 is off, it does not affect to the control by the transistor $Q_{11}$. Thus, the circuit is energized only when the push button switch SW13 is on. As the circuit is energized, at an early stage of the energization, an output of an inverter $INV_4$ assumes an L-level for a predetermined period determined by a resistor $R_1$ and a capacitor $C_1$ and flip-flops ($G_7$, $G_8$) ($G_{20}$, $G_{21}$) and ($G_{26}$, $G_{27}$) are reset and other digital circuits not shown are also reset. By the reset operation, an output of a NAND gate $G_7$ is L, an output of the gate $G_8$ is H and an output of the gate $G_{20}$ is L. As explained in FIG. 1, since the wind-up limit switch SW5 is held on, an output of a gate $G_3$ is H, and an output of an inverter $INV_1$ is L. Accordingly, an output of an gate $G_6$ is held H so that the flip-flop ($G_7$, $G_8$) is not set by the push button switch SW6 to be described later.

Since the rewind switch SW14 is off, an output of an inverter $INV_{13}$ is L, outputs of AND gates $G_{16}$, $G_{17}$, $G_{23}$ and $G_{31}$ are L and an output of a gate $G_{32}$ is H. An output of an inverter $INV_5$ is H because the output of the NAND gate $G_7$ is L. Since all inputs to an AND gate $G_9$ are H, an output thereof is H and an output of a NOR gate $G_{10}$ is L. Since a transistor $Q_{16}$ is non-conductive, a capacitor $C_6$ is charged through the resistor $VR_3$ but an output of a comparator $A_2$ is held H until the voltage of the capacitor $C_6$ reaches a predetermined voltage, that is, until a predetermined period determined by a time constant circuit $VR_3$ and $C_6$ is elapsed. Accordingly, an output of an AND gate $G_{13}$ is L and outputs of an AND gate $G_{14}$ and an OR gate $G_{15}$ are H. The H-output of the OR gate $G_{15}$ renders a transistor $Q_{10}$ conductive through a diode $D_6$ to short a capacitor $C_{11}$ to discharge it and holds a transistor $Q_9$ non-conductive. At the same time, a transistor $Q_6$ is biased to conductive state through a resistor so that transistors $Q_1$ and $Q_7$ are turned on. Since the output of the AND gate $G_{13}$ is L, transistors $Q_3$, $Q_4$ and $Q_2$ are non-conductive. As a result, a current flows to the motor 600 from a battery Ep through the transistor $Q_1$, the motor 600 and the transistor $Q_7$. Thus, the motor 600 is rotated reversely. As the motor 600 is rotated reversely, the D.C. tachogenerator 601 is also rotated in the same direction and a current flows into the resistor $VR_2$ and a resistor $R_7$ through the diodes $D_1$ and $D_4$. As the rotating speed of the motor 600 increases, the voltage across the resistor $R_7$, that is, a voltage at a (+) input terminal of a comparator $A_1$ increases, and when it exceeds a reference voltage of a power supply Es, an output of the comparator $A_1$ assumes H and transistors $Q_5$ and $Q_8$ are turned on. As the transistor $Q_8$ is conductive, the transistor $Q_6$ is turned off and the transistors $Q_1$ and $Q_7$ are also turned off. Therefore, the motor 600 is deenergized and the rotating speed is reduced. Since the rotation of the motor 600 is velocity fed back, the rotating speed is controlled to a predetermined speed determined by the resistance preset by the resistor $VR_2$. The velocity feedback is effected when the switch SW9 selects the terminal a in accordance with the lever 401 of the speed selection switch. When the switch SW9 selects the terminal b, that is, the maximum speed, the generated voltage of the D.C. tachogenerator 601 is not supplied and the velocity feedback is not effected. Thus, the motor 600 is rotated at the maximum speed determined by the voltage of the power supply $E_B$. Under this condition, the on and off states of the transistor $Q_{17}$ does not contribute to the control operation. When the push button switch SW13 is turned off or when the predetermined period determined by the time constant circuit $VR_3$ and $C_6$ has elapsed, the transistors $Q_6$ and $Q_{10}$ are turned off, and when a predetermined period determined by the resistor and capacitor $C_{11}$ has elapsed, the transistor $Q_9$ is turned on so that only the transistors $Q_1$ and $Q_2$ are conductive through diodes $D_9$ and $D_{10}$. Since the motor 600 has been rotated reversely, the motor 600 is shorted by a diode $D_7$ and the transistor $Q_2$ so that it is braked and rapidly stopped. After the motor 600 has been stopped, the capacitor $C_{11}$ is charged up and the transistor $Q_9$ is turned off and the transistors $Q_1$ and $Q_2$ are also turned off. Under this condition, the motor 600 is rotated reversely while the switch SW13 is on when the on-time of the switch SW13 is within the predetermined period determined by the resistor $VR_3$ and the capacitor $C_6$, and for the predetermined period when the on-time of the switch SW13 is longer than the predetermined period.

When the rear cover is open, the switch SW17 is on and the reference voltage applied to the (+) input terminal of the comparator $A_2$ is lower than that when the switch SW17 is off. Thus, for a given setting of the resistor $VR_3$, a time required for the output of the comparator $A_2$ to be changed to L when the switch SW17 is on is shorter than that when the switch SW17 is off. This is because a timer period by a timer circuit $VR_3$, $C_6$ and $A_2$ should be longer than a time period necessary to wind up the film to the first frame exposure position after the rear cover is closed. On the other hand, if the timer period is long when the rear cover is open, and if the on-time of the switch $S_{13}$ is long, the film is wound on the spool excessively and the film is wasted. This happens particularly when the film is loaded under the high speed wind-up condition in which the switch SW9 selects the terminal b and a manipulation of the push button by the user does not follow the wind-up speed of the spool. It also happens by a careless manipulation. In order to avoid the above inconvenience, when the rear cover is open, the switch SW17 is turned on to lower the reference voltage and shorten the timer period. The timer period is set to approximately one revolution time of the spool 29 shown in FIG. 1 and it is controlled in association with the motor speed by the resistor $VR_3$ which is set in association with the motor speed. Accordingly, in a normal operation, the leader of the film is inserted into the spool 29 and the push button 100 is continuously depressed. Thus, a required amount of film is wound.

(1)-2 When the rear cover is closed:

When the rear cover of the camera is closed after the film 28 has been wound on the spool 29 by the operation of (1)-1, the leader of the film is wound so that the first frame of the film is brought to the exposure position. It is carried out in the following manner. When the rear cover is in the closed position, the switch SW12 is turned on and the switch SW17 is turned off and the switch SW5 remains on. When the push button 100 is depressed under this condition, the switch SW13 is turned on and the transistor $Q_{11}$ is rendered conductive. Thus, the circuit is energized and the motor 600 is rotated reversely by the same reason as the operation of (1)-1. After the switch SW13 is turned off, the on-state of the transistor $Q_{11}$ is held for a predetermined period (normally 20 seconds to several minutes) determined by a resistor $R_8$ and a capacitor $C_{12}$ by the positive feedback of the transistor $Q_{12}$, and the circuit is continuously energized.

When the film is fed to the first frame exposure position, the switch SW5 is turned off. The trailing shutter curtain switch SW4 is on and the switch SW1 is on. Accordingly, the outputs of the AND gates $G_1$ and $G_2$ are held L. Thus, when the wind-up switch SW5 is turned off, the output of the OR gate $G_3$ is changed to L and the outputs of the AND gates $G_9$ and $G_{14}$ and the OR gate $G_{15}$ are changed to L so that the motor 600 is rapidly stopped. Thus, the wind-up operation of the film leader is completed. The output of the NOR gate $G_{10}$ changes to H and the transistor $Q_{16}$ is turned on. Accordingly, the capacitor $C_6$ of the timer circuit is reset. The resistor $VR_3$ is set in linked relation with the resistor $VR_2$ which sets the reverse rotating speed of the motor 600. Since the amount of wind-up of the film leader is constant by the film counter mechanism shown in FIG. 1, the wind-up time for the film leader is determined based on the reverse rotating speed of the motor 600. Since the time period to the inversion of the output of the comparator $A_2$ by $VR_3$ and $C_6$ is set longer than the wind-up time, the motor stop operation by the inversion of the output of the comparator $A_2$ to L is not effected during the normal wind-up operation of the film leader. The predetermined period in this case is longer than the predetermined period described in the operation of (1)-1. It is controlled by the rise of the (+) reference voltage of the comparator $A_2$ because the switch SW17 is turned off when the rear cover is closed. If the film is stopped in the course of the wind-up operation because of jam or the wind-up operation is not effected by a trouble of the mechanism, the switch SW5 is not turned off within the predetermined period determined by $VR_3$ and $C_6$. Thus, the output of the comparator $A_2$ changes to L and the motor 600 is stopped, an output of an inverter $INV_{10}$ changes to H, an output of an OR gate 18 changes to H and a light emitting diode $LED_2$ is lit to issue an alarm. In the operation of (1) described above, the flip-flops ($G_7$, $G_8$) and ($G_{26}$, $G_{27}$) are not flipped and hence the exposure control to be described in (2) is not effected. The wind-up speed is appropriately selected by the speed change lever 401 in the same manner as described above.

(2) Circuit operation in the photographing mode (2)-1 Normal continuous photographing mode:

In the following description, it is assumed that the switch SW9 selects the terminal a and the switch SW8 selects the terminal C (off). The multiphotographing selection switch SW2 selects the normal photographing mode and hence it is on. Thus, the output of the AND gate $G_1$ is held L. Since the mirror switch SW1 is on when the mirror is in the descended position, the output of the AND gate $G_2$ is also L. Since the switch SW5 is off at the end of the wind-up operation of the film leader, the output of the OR gate $G_3$ is L and an output of a NAND gate $G_{30}$ and an output of the inverter $INV_1$ are H. When the push button switch SW6 is turned on by the actuation of the push button 100 of FIG. 1, an output of an inverter $INV_2$ changes to H and the output of the AND gate $G_4$ changes to H because the output of the NAND gate $G_{30}$ is H. Thus, an output of an inverter $INV_3$ changes from H to L. On the other hand, if the predetermined reset period determined by the time constant circuit $C_1$ and $R_1$ has been elapsed, the output of the inverter $INV_4$ is H, the mirror stop switch SW7 is off when the mirror before it is released is in the descended position, the rewind switch SW14 linked to the rewind lever 155 of FIG. 1 is off and the rewind button switch SW15 is on. Therefore, the outputs of the AND gates $G_{16}$ and $G_{31}$ are L and the output of the NOR gate $G_{32}$ is H. Since all inputs to an AND gate $G_5$ are H, an output thereof is H. As described above, the output of the inverter $INV_1$ is also H. Accordingly, the output of the NAND gate $G_6$ is L for the predetermined period determined by the time constant circuit $R_2$ and $C_2$ after the push button switch SW6 has been turned on. Thus, the flip-flop ($G_7$, $G_8$) flips and the output of the NAND gate $G_7$ changes to H. The predetermined time determined by $R_2$ and $C_2$ need be a time period required for the flip-flop ($G_7$, $G_8$) to flip, and after the flip the output of the NAND gate $G_6$ immediately returns to H. As the output of the NAND gate $G_7$ changes to H, the output of the inverter $INV_5$ changes to L to hold the output of the AND gate $G_9$ L and change the output of the NOR gate $G_{10}$ to L. As a result, the transistor $Q_{16}$ is turned off and the clock of the timer circuit $VR_3$, $C_6$ and $A_2$ is started. At the same time, the output of the AND gate $G_{13}$ changes to H and a transistor $Q_3$ is turned on, the transistors $Q_2$ and $Q_4$ are turned on and the transistor $Q_{10}$ is turned on through a diode $D_5$. Thus, the transistor $Q_9$ is held off. Since the output of the AND gate $G_9$ is held L, the output of the AND gate $G_{14}$ is L and the output of the AND gate $G_{16}$ is also L. Thus, the output of the OR gate $G_{15}$ is L and the transistors $Q_6$, $Q_7$ and $Q_1$ are off. As the transistors $Q_2$ and $Q_4$ are turned on, a current flows into the motor 600 in the path of $Q_2 \rightarrow$ motor 600 $\rightarrow Q_4$ and the motor 600 is rotated forwardly. Thus, the tachogenerator 601 is also rotated forwardly, and the generated voltage is positive at the anode of the diode $D_3$. Thus, a current flows through the diode $D_3$ in the direction of $D_3 \rightarrow R_6 \rightarrow R_7 \rightarrow D_2$, and when a voltage across the resistor $R_7$ reaches the voltage Es, the output of the comparator $A_1$ is inverted to turn on the transistor $Q_5$. Thus, the velocity feedback control is effected in the same manner as described above. The speed of the motor 600 is controlled such that a predetermined forward speed is attained at a ratio of $R_6$ and $R_7$. The setting speed is selected to a speed sufficient to assure the control precision when the stop aperture is electrically controlled and the speed is kept constant in order to keep the shutter release timing constant. As the motor 600 is rotated forwardly, the shutter is charged and the mirror is raised as explained in FIG. 1, and the switch SW4 is first turned off and then the switch SW4 is turned off. Thus, the outputs of the gates $G_2$ and $G_3$ are kept L. On the other hand, when the switch SW18 is turned off, an output of an OR gate $G_{11}$ changes to H because the output of the gate $G_7$ is H and this state is held when the mirror is raised to turn on the switch SW7, reset the flip-flop ($G_7$, $G_8$) and change the output of the gate $G_7$ to L, because the switch SW1 is off. The H-level signal of the OR gate $G_{11}$ is transmitted to a terminal $P_1$ of an exposure control unit 604. While the terminal $P_1$ of the exposure control unit 604 is at the H-level, a known light measurement memory in the exposure control unit 604 is activated to store a light measurement of a photodiode PD which is a photosensitive element. Simultaneously with the turn-on of the push button switch SW6, the light measurement is stored and it is held until the exposure is completed and the mirror 132 of FIG. 1 descends. As the mirror 132 is raised, the switch SW7 is turned on, the output of the AND gate $G_5$ changes to L, the output of the NAND gate $G_6$ is held H, the flip-flop ($G_7$, $G_8$) is reset and the output of the gate $G_7$ changes to L. When the push button switch SW6 is turned on and the output of the gate $G_7$ of the flip-flop ($G_7$, $G_8$) is H, an output of an AND gate $G_{19}$ can respond to an output at a stop control signal terminal $P_2$ of the exposure control unit 604. In a mode such as a shutter priority AE mode or a programmed AE mode in which the stop aperture is electrically controlled, the output at the terminal $P_2$ changes from L to H when the desired stop aperture is reached based on the stored light measurement in the exposure control unit 604, and the output of the AND gate $G_{19}$ changes to H. Thus, a transistor $Q_{14}$ is turned on so that a charge stored in a capacitor $C_7$ is discharged through the stop control magnet $Mg_1$. As a result, the stop control mechanism is actuated to adjust the stop aperture to the desired aperture. The stop aperture feedback control for attaining the desired stop aperture is effected by the resistor $VR_1$ connected to the exposure control unit 604. The generated voltage of the tachogenerator 601 as the motor 600 is rotated forwardly is applied to a stopping down speed compensation input terminal $P_7$ of the exposure control unit 604. This is because there is a steady delay determined by the characteristic of the magnet $Mg_1$ and the inertia of the engagement mechanism between the energization of the stop control magnet $Mg_1$ and the engagement of the stop control mechanism, and if the compensation is not effected when the relation between the delay and the rotating speed of the motor 600 is not fixed, the precision of the stop control is lost in the mode in which the stop is electrically controlled. Because of the inertia of the drive mechanism including a rotor of the motor 600, a rise characteristic of the speed before a constant speed is reached is finite and the relation between the delay and the rotating speed of the motor 600 is not fixed in that region. As a result, a control error is included and the rise characteristic is affected by the voltage of the power supply $E_B$. Accordingly, in order to eliminate the affect, the voltage of the tachogenerator 601 related to the speed of the motor 600 is transmitted to the exposure control unit 604 to compensate the stop control. The compensation will be explained later in connection with FIG. 13. When a mode such as an aperture priority AE mode or a manual exposure setting mode in which the stop aperture is not electrically controlled is selected by the exposure mode selection means of the exposure control unit 604, the output at the terminal $P_2$ is kept L so that the output of the AND gate $G_{19}$ is not changed to H and the stop aperture is not electrically controlled.

The switch SW18 is turned on to fix the memory of the light measurement. When the memory fixing switch SW18 is turned on, the output of the OR gate $G_{11}$ is held H so that the stored light measurement is continuously held. Before the push button switch SW6 is turned on, the camera is directed to an object a light measurement of which is to be fixed and the switch SW18 is turned on. Thus, the light measurement is continuously stored. Thereafter, when the camera is directed to another object and the push button switch SW6 is turned on, the auto-exposure control is effected not by the light measurement of the object but by the stored light measurement.

As the mirror is raised, the outputs of the gate $G_7$ of the flip-flop ($G_7$, $G_8$) changes from H to L, and while the mirror is in the raised position and the switch SW7 is on, the output of the AND gate $G_5$ is held L and the output of the NAND gate $G_6$ is held H. Accordingly, the flip-flop ($G_7$, $G_8$) is inhibited from flipping while the mirror is in the raised position. When the output of the gate $G_7$ of the flip-flop ($G_7$, $G_8$) changes from H to L, the forward rotation of the motor 600 is stopped and it is not driven reversely because the output of the OR gate $G_3$ is L. Thus, the motor 600 is rapidly stopped by the turn-on of the transistor $Q_9$ for the predetermined time. When the output of the gate $G_7$ of the flip-flop ($G_7$, $G_8$) changes from H to L, an output of an inverter $INV_6$ changes from L to H after the predetermined period of the time constant circuit $R_3$ and $C_3$. As the output of the inverter $INV_6$ changes from L to H, an output of an AND gate $G_{12}$ changes to H for the predetermined period determined by $R_4$ and $C_4$ so that a transistor $Q_{13}$ is turned on and a charge stored a capacitor $C_5$ is discharged through a leading shutter curtain control magnet $Mg_2$. Thus, the leading shutter curtain 115 of FIG. 1 is moved to start the exposure. The predetermined delay time determined by the time constant circuit $C_3$ and $R_3$ is usually set to an expected time for the motor 600 to be fully stopped because the motor 600 is not instantly stopped when it is braked. This assures that the vibration of the motor 600 does not influence to the photographing. If the vibration is negligible, the delay time may be zero. A diode $D_{15}$ connected in parallel with the resistor $R_3$ and a diode $D_{15}$ connected in parallel with a resistor $R_4$ serve to rapidly charge the capacitors $C_3$ and $C_4$ and they are isolated during the discharge period to give the predetermined delay times. As the leading shutter curtain is moved by the turn-on of the transistor $Q_{13}$ for the predetermined period, an output of an inverter $INV_8$ changes from H to L, the output of the gate $G_{21}$ of the flip-flop ($G_{20}$, $G_{21}$) changes from L to H and the output of the gate $G_{20}$ changes from H to L. Since an output of a gate $G_{22}$ does not change but remains L, a transistor $Q_{15}$ is off. The leading shutter curtain start signal by the change of the output of the NAND gate $G_{21}$ from L to H is transmitted to the input terminal $P_3$ of the exposure control unit 604 so that a known shutter timer circuit in the exposure control unit 604 is started.

In the automatic exposure mode such as aperture priority AE mode, shutter priority AE mode or programmed AE mode, the shutter timer circuit controls a shutter time calculated based on the stored light measurement to start clocking from the leading shutter curtain start signal supplied to the terminal $P_3$, and after the calculated time period is timed up, a trailing shutter curtain start signal which changes from H to L is produced at an output terminal $P_4$ which is supplied to the NAND gate $G_{20}$. The output signal at the terminal $P_4$ is held L before the leading shutter curtain start signal is supplied to the terminal $P_3$, and when it is supplied, the output signal at the terminal $P_4$ changes from L to H, and when the shutter time circuit times up, the output at the terminal $P_4$ changes from H to L so that the trailing shutter curtain start signal is produced. The L-state is held until the leading shutter curtain start signal is again produced. In the manual exposure mode, the shutter time circuit operates at the shutter time selected by a shutter time setting member, not shown, in the exposure control unit 604. An on-off signal of the push button switch SW6 is supplied to an input terminal $P_4$ of the exposure control unit 604.

If the shutter time selected in the manual exposure setting mode is bulb, the output at the terminal $P_4$ is independent from the shutter timer circuit, and when the leading shutter curtain start signal is supplied to the input terminal $P_3$, the output at the terminal $P_4$ changes to H. Since the input to the terminal $P_5$ is H if the push button switch SW6 is off, the output terminal $P_4$ immediately produces the trailing shutter curtain start signal which changes from H to L. If the push button switch SW6 is on, the input to the terminal $P_5$ is L and the output at the terminal $P_4$ is held H, and when the push button switch SW6 is subsequently turned off, the input to the terminal $P_5$ changes to H and the output terminal $P_4$ produces the trailing shutter curtain start signal which changes from H to L.

When the output terminal $P_4$ produces the trailing shutter curtain start signal, the output of the flip-flop ($G_{20}$, $G_{21}$) is flipped so that the output of the NAND gate $G_{20}$ changes from L to H and the output of the NAND gate $G_{21}$ changes from H to L and the output of the gate $G_{22}$ is H for the predetermined period determined by a time constant circuit $R_5$, $C_8$. Thus, the transistor $Q_{15}$ is turned on. As the transistor $Q_{15}$ is turned on, a charge stored in a capacitor $C_9$ is discharged through the trailing shutter curtain control magnet $Mg_3$ so that the trailing shutter curtain 115' of FIG. 1 is moved to terminate the exposure. When the switch SW4 is turned on by the closure of the trailing shutter curtain 115', the output of the gate $G_2$ changes to H because the switch SW1 is off at this time, and the output of the AND gate $G_9$ changes to H through the OR gate $G_3$. Accordingly, the transistor $Q_6$ is turned on through the AND gates $G_{14}$ and $G_{15}$ and the motor 600 is rotated reversely. During the H-state of the output of the OR gate $G_3$, the output of the inverter $INV_1$ is L. Thus, the flip-flop ($G_7$, $G_8$) is not flipped by the output of the gate $G_6$ to produce the forward rotation signal to the motor 600. As the motor 600 starts to be rotated reversely, the mirror drive control and the stop control mechanism are reset at the early stage of the reverse rotation as described in FIG. 1. When the mirror is descended by the reverse rotation of the motor, the switch SW1 is turned on and the output of the gate $G_2$ changes to L, but since the switch SW5 is turned on earlier, the output of the gate $G_3$ is held H and the motor 600 is continuously rotated reversely. Since the output of the gate $G_3$ is held H by the turn-on of the switch SW5, the reverse rotation of the motor 600 continues and the film is wound up. When a predetermined amount of film has been wound up, the wind-up limit switch SW5 is turned off and the output of the gate $G_3$ changes to L and the reverse rotation of the motor 600 is stopped to terminate the wind-up of the film. During the reverse rotation of the motor, the rotating speed is determined by the resistor $VR_2$ and the switch SW9 as described above. When the output of the gate $G_3$ changes to L as the wind-up of the film terminates, the output of the inverter $INV_1$ changes to H. Since the mirror is in the descended position, the switch SW7 is off and the output of the gate $G_5$ is H. Thus, the NAND gate $G_6$ can respond to the change of the AND gate $G_4$. Since the switch SW8 is connected to the terminal C (off), when the output of the NAND gate $G_{30}$ changes from L to H at the end of the wind-up, the output of the AND gate $G_4$ changes from L to H if the push button switch SW6 is on at that time. The output of the gate $G_6$ is L for the predetermined period determined by the time constant circuit $R_2$, $C_2$ and the flip-flop ($G_7$, $G_8$) is flipped to produce the motor forward rotation signal. Thus, during the on-time of the push button switch SW6, the cycle of motor forward rotation (mirror rise, stopping down) →motor stop→shutter control→motor reverse rotation (mirror return, stop opening)→motor reverse rotation (film wind-up)→motor forward rotation (mirror rise, stopping down)→ . . . is repeated so that continuous photographing is effected. When the push button switch SW6 is turned off, the output of the gate $G_4$ is held L because the output of the inverter $INV_2$ is L, and the motor is stopped at the completion of the wind-up of the film and the next photographing sequence is not started. Thus, the continuous photographing is terminated.

The operation when the switch SW9 selects the terminal b, that is, the maximum speed mode is now explained.

Before the push button switch SW6 is turned on, an output of a gate $G_{29}$ is L and an output of a gate $G_{25}$ is held H so that the flip-flop ($G_{26}$, $G_{27}$) is forcibly reset and the output of the gate $G_{26}$ is L and an output of a gate $G_{28}$ is also L. Accordingly, a transistor $Q_{17}$ is off. When the push button switch SW6 is turned on, the output of the gate $G_{29}$ is held H and the forced reset is released. The flip-flop ($G_7$, $G_8$) is flipped and the motor 600 is rotated forwardly to raise the mirror and control the stop, but since the AND gate $G_{12}$ does not produce the H-level pulse at this time, the output of the NAND gate $G_{25}$ remains H. Accordingly, the state of the flip-flop ($G_{26}$, $G_{27}$) does not change and the output of the gate $G_{26}$ is L, the output of the gate $G_{28}$ is L and the transistor $Q_{17}$ is off. Accordingly, the motor speed in the forward rotation is kept constant by the velocity feedback. When the mirror has been raised, the switch SW7 is turned on, the flip-flop ($G_7$, $G_8$) is reset, the motor is stopped and the output of the AND gate $G_{12}$ changes to H after the predetermined period determined by $R_3$ and $C_3$. By the H-level output of the AND gate $G_{12}$, the leading shutter curtain is moved to start the exposure and the output of the NAND gate $G_{25}$ changes to L and the flip-flop ($G_{26}$, $G_{27}$) is set so that the output of the gate $G_{26}$ changes to H. An output at an exposure mode output terminal $P_6$ of the exposure control unit 604 is L in the mode such as shutter priority AE mode or programmed AE mode in which the stop is electrically controlled, and it is H in the mode such as aperture priority AE mode or manual exposure setting mode in which the stop is not electrically controlled.

Accordingly, in the shutter priority AE mode or the programmed AE mode, the output of the AND gate $G_{28}$ is held L independently from the output state of the NAND gate $G_{26}$, but in the aperture priority AE mode or the manual exposure setting mode, the output of the AND gate $G_{28}$ depends on the output state of the NAND gate $G_{26}$. Assuming that the aperture priority AE mode or the manual exposure setting mode is selected, when the flip-flop ($G_{26}$, $G_{27}$) is set and the output of the NAND gate $G_{26}$ changes to H, the output of the AND gate $G_{28}$ changes to H and the transistor $Q_{17}$ is turned on. As the transistor $Q_{17}$ is turned on, the velocity feedback control to the rotation of the motor 600 is ceased. The trailing shutter curtain is controlled and the exposure is effected. Then, the motor 600 is rotated reversely to descend the mirror and wind up the film. Since the switch SW9 now selects the terminal b or the maximum speed, the velocity feedback control is not effected and the motor is rotated at the maximum speed depending on the voltage of the power supply $E_B$. At the end of the wind-up, if the push button switch SW6 is on, the flip-flop ($G_7$, $G_8$) is again set and the motor 600 is rotated forwardly to prepare for the next frame photographing. Because the transistor $Q_{17}$ is on, the constant velocity control is not effected and the motor is rotated at the maximum speed. Thereafter, while the push button switch SW6 is continued to be depressed to allow the continuous photographing, the on-state of the transistor $Q_{17}$ is held and the velocity feedback is not effected and the motor 600 is rotated at the maximum speed. When the push button switch SW6 is turned off, the continuous photographing mode is stopped with the wind-up of the film completed and the output of the NAND gate $G_{29}$ changes to L. Thus, the flip-flop ($G_{26}$, $G_{27}$) is reset and the outputs of the NAND gates $G_{26}$ and $G_{28}$ are L and the transistor $Q_{17}$ is turned off. When the switch SW6 is again turned on, the velocity feedback control is effected in the forward rotation of the motor for the first one frame photographing but the velocity feedback is not effected in the rotation of the motor in the following continuous photographing mode and the maximum speed rotation is attained. In the shutter priority AE mode or the programmed AE mode, the output at the terminal $P_4$ of the exposure control unit 604 is L and the output of the gate $G_{28}$ is held L. Thus, the transistor $Q_{17}$ remains off and the constant velocity feedback control is effected during the forward rotation of the motor, but the motor is rotated at the maximum speed during the reverse rotation.

As described above, only when the maximum speed continuous photographing mode is selected in the aperture priority AE mode or the manual exposure setting mode, the constant velocity control is effected in the forward rotation at the first release of the continuous photographing mode, and in the subsequent continuous photographing mode, the motor is rotated at the maximum speed both for the forward rotation and the reverse rotation. An advantage thereof is that since a release timing for the first frame in the continuous photographing mode is set by a user of the camera, it is desirable that the motor speed is constant in any mode, while since the timing in the subsequent continuous photographing mode is determined by the camera, the motor need not be rotated forward at the constant speed and unnecessary time is saved so that high speed continuous photographing is attained. In the shutter priority AE mode or the programmed AE mode, the stop is electrically controlled during the forward rotation of the motor. Therefore, the rotating speed should be controlled to a predetermined speed in order to assure the precision of the stop control. Accordingly, the constant velocity feedback control is always effected during the forward rotation.

The photographing mode can be terminated at any time during the continuous photographing mode by turning off the push button switch SW6. If it occurs during the forward rotation of the motor, the motor continues to be rotated forwardly until the frame is exposed and the film is wound up, and the inhibition of the velocity feedback by the on-state of the transistor $Q_{17}$ is continued, and when the wind-up is completed, a reset signal to the flip-flop ($G_{26}$, $G_{27}$) is generated. Thus, the gate $G_{29}$ of the flip-flop is controlled by the output of the gate $G_{28}$.

(2)-2 Normal one-frame photographing mode:

In this mode, the switch SW8 selects the terminal S. The multi-exposure selection switch SW2 selects the normal photographing mode (on) and the output of the gate $G_1$ is held L. The operation in this mode is same as that in (2)-1 except the re-release operation by the on-state of the push button switch SW6 is not effected in synchronism with the completion of the wind-up of the film. Since the switch SW8 selects the terminal S (on), the output of the gate $G_{30}$ is held H. Since the output of the gate $G_4$ responds only to the push button switch SW6 without regard to the output of the gate $G_3$, if the push button switch SW6 is turned on when the output of the gate $G_5$ and the output of the inverter $INV_1$ are H, the output of the gate $G_4$ changes from L to H and the gate $G_6$ produces an L output for the predetermined period determined by $R_2$ and $C_2$ to flip the flip-flop ($G_7$, $G_8$) so that the release operation is started by the forward rotation of the motor. Even after the exposure control and the wind-up of the film have been completed, the output of the gate $G_4$ is held H while the push button switch SW6 is held on, and only when the output of the gate $G_4$ changes from L to H, the output of the gate $G_6$ changes to L for the predetermined period determined by $R_2$ and $C_2$ and thereafter it is held H and the output of the gate $G_6$ does not change to L. In order to re-release, the push button switch SW6 is turned off to charge up the capacitor $C_2$. When the push button switch SW6 is turned on after the recharge of the capacitor $C_2$, the output of the NAND gate G6 changes to L to start the re-release operation if the output of the AND gate $G_5$ and the output of the inverter $INV_1$ are H. Thus, each time when the push button switch SW6 is turned on, the exposure is made frame by frame. In the one-frame photographing mode, the switch SW8 is on and the output of the NAND gate $G_{25}$ is held H. Thus, the flip-flop ($G_{26}$, $G_{27}$) remains reset and is not flipped and the transistor $Q_{17}$ is always off. Accordingly, even when the switch SW9 selects the terminal b or the maximum speed mode, the constant velocity feedback control is effected to the forward rotation of the motor. This is because it is desirable to set the constant speed of the motor in any mode because the release timing is set by the user of the camera each time not only in the mode in which the stop is electrically controlled but also in the mode in which the stop is not electrically controlled. Accordingly, in the forward and reverse rotations of the motor, the rotating speed of the motor 600 is controlled in accordance with the independently set speeds.

(2)-3 Multi-exposure continuous photographing mode:

In this mode, the switch SW8 selects the terminal C (off) and the multi-exposure selection lever 171 of FIG. 1 is in the multi-exposure position. Thus, the switch SW2 is off and the switch SW5 is held off in the multi-exposure position. It is assumed that the switch SW9 selects the terminal a. Since the switch SW2 is off, an H-level signal is supplied to a multi-exposure alarm circuit (OSC) 602 which produces a flashing signal to a light emitting diode LED1 to alarm the multi-exposure mode. The LED1 is preferably arranged in a view finder in a known manner. In the film wind-up completion condition prior to releasing, the switch SW1 is on, the switch SW3 is on, the switch SW4 is on, the switch SW5 is off and the switch SW7 is off. Accordingly, the outputs of the gates $G_1$, $G_2$ and $G_3$ are L. Since the outputs of the inverter $INV_1$, the gate $G_5$ and the gate $G_{30}$ are H, when the push button switch SW6 is turned on, the output of the gate $G_6$ changes to L for the predetermined period and the flip-flop ($G_7$, $G_8$) is flipped to produce the motor forward rotation signal. As the motor is rotated forwardly, the mirror is raised and the stop control is effected, and when the mirror reaches a predetermined position, the switch SW7 is turned on. As a result, the flip-flop ($G_7$, $G_8$) is reset and the motor is stopped and the exposure by the shutter is started. When the trailing shutter curtain is closed, the switch SW4 is turned on, and since the outputs of the gates $G_2$ and $G_1$ are H, the output of the gate $G_3$ changes to H and the motor 600 is rotated reversely to descend the mirror and reset the stop control mechanism. As the mirror descends, the switch SW1 is turned on and the output of the gate $G_2$ changes to L, but since the switch SW3 is off until a predetermined phase immediately before the wind-up of the film starts, the output of the gate $G_1$ is H and the reverse rotation of the motor continues. At the predetermined phase immediately before the wind-up of the film starts, the switch SW3 is turned on and the output of the gate $G_1$ changes to L. By the L-state output of the gate $G_1$, the reverse rotation of the motor is stopped and the outputs of the inverter $INV_1$ and the gate $G_{30}$ change from L to H. Thus, like the operation of (2)-1, if the push button switch SW6 is on at that moment, the output of the gate $G_4$ changes from L to H and the output of the gate $G_6$ changes to L for the predetermined period determined by $R_2$ and $C_2$, and the flip flop ($G_7$, $G_8$) is flipped to produce the motor forward rotation signal so that the release operation is again started. Accordingly, while the push button switch SW6 is on, the film is not fed and the multi-exposure is repeated, and when the push-button switch SW6 is turned off, the film is stopped at the phase immediately before the wind-up, and when the push-button switch SW6 is again turned on, the multi-exposure is effected any times.

In accordance with the embodiment of FIG. 5, when the multi-exposure mode is returned to the normal photographing mode, the switch SW6 is turned on, the output of the gate $G_3$ changes to H and the motor reverse rotation signal is produced. Thus, the film is wound up and when the predetermined amount of film has been wound up, the switch SW5 is turned off and the rightward rotation of the motor is stopped.

The operation when the switch SW9 selects the terminal a is similar to that of (2)-1. That is, the constant velocity feedback control is effected in both the forward rotation and the reverse rotation of the motor.

When the switch SW9 selects the terminal b, the operation is similar to that of (2)-1. That is, in the aperture priority AE mode and the manual exposure setting mode, at the first exposure after the turn-on of the switch SW6, the forward rotation of the motor is constant velocity controlled in order to keep the release timing constant, and the subsequent reverse rotation is effected at the maximum speed because the velocity feedback is not effected, and the following forward and reverse rotations for the continuous multi-exposure are effected at the maximum speed without the velocity feedback. In the shutter priority AE mode and the programmed AE mode, the constant velocity control is effected during the forward rotation.

(2)-4 One-frame multi-exposure mode:

This mode is attained by switching the switch SW8 to the terminal S (on) in the operation of (2)-3. In this mode, the output of the NAND gate $G_{30}$ remains H and the release operation is similar to that of (2)-2. That is, when the output of the AND gate $G_5$ is H and the push button switch SW6 is on, the flip-flop ($G_7$, $G_8$) is flipped so that the motor is rotated forward to start the releasing operation of the camera. Even if the push button switch SW6 is continuously on, the exposure is completed, the mirror has descended and the camera is stopped at a condition immediately before the film is fed. If the push button switch SW6 is turned off and then on in order to re-release, multi-exposure is effected. In order to return the mode from the multi-exposure mode to the normal exposure mode, the lever 171 is returned to the normal photographing position as described in (2)-3. In the one-frame multi-exposure mode, the motor is always constant velocity controlled independently from the state of the switch SW9 and the exposure mode such as the shutter priority AE mode or the aperture priority AE mode, by the same reason as that described in (2)-2, and the reverse rotation is effected at any selected speed.

(3) Operation at the end of the film

The film end operation is effected in the film feed sequence in the normal photographing mode. When the film can no longer be pulled out of the magazine at the end of the film during the film feed, the predetermined amount of film is not wound up and the switch SW5 remains off. As a result, the output of the comparator $A_2$ changes to L after a predetermined period corresponding to the selected wind-up time determined by the resistor $VR_3$, the capacitor $C_6$ and the comparator $A_2$ so that the outputs of the AND gates $G_{13}$ and $G_{14}$ are held L to stop the motor. Since the output of the inverter $V_{10}$ changes to H and the output of the OR gate $G_{18}$ changes to H, the alarm light emitting diode $LED_2$ is lit to alarm the auto-stop of the motor.

(4) Operation in the film rewind

The operation procedes in the following manner as explained in FIG. 1. When the rewind button 7 is first depressed and the rewind lever 155 is set to the rewind position, the rewind operation is started. By depressing the rewind button 7, the switch SW15 is turned off, and as the rewind lever is set to the rewind position, the switch SW16 is off if the film is not exhausted and the output of the gate $G_{16}$ changes to H. Since an output of the inverter $INV_{12}$ is L, the output of the gate $G_{17}$ is L and the rewind alarm circuit 603 is not activated and the output to the OR gate $G_{18}$ is L. Since the switch SW14 is on, an output of a gate $G_{24}$ is L. The output of the gate $G_{23}$ is L because the output of the inverter $INV_{14}$ is L because the switch SW16 is off. As the output of the gate $G_{16}$ changes H, the output of the gate $G_{15}$ also changes to H and the motor starts to be rotated reversely to rewind the film. Since the output of the gate $G_{16}$ is H, the output of the NOR gate $G_{32}$ is held L and the output of the gate $G_5$ is also held L. Thus, the flip-flop ($G_7$, $G_8$) is held reset so that it does not produce the motor forward rotation signal.

An inverter $INV_{11}$ produces an inhibit signal such that if the film rewind is erroneously set when the switch SW1 is off, that is, while the mirror is in the raised position for the exposure, the film is not instantly rewound but the motor is rotated reversely to rewind the film after the exposure has been completed and the mirror has descended. The L-output of the NOR gate $G_{32}$ in the rewind state holds the output of the gate $G_9$ L. Thus, when the film rewind is started, the transistor $Q_{16}$ is held on and the timer circuit ($VR_3$, $C_6$ and $A_2$) is deactuated during the rotation of the motor. While the switch SW14 is on, the transistor $Q_{11}$ is rendered on through a diode $D_{11}$ to keep the feeding to the circuit.

When the film rewind is completed, the switch SW16 is turned on and the output of the gate $G_{16}$ changes to L and the output of the gate $G_{31}$ changes to H. Thus, the output of the gate $G_{32}$ remains L and the output of the gate $G_9$ is held L and the flip-flop ($G_7$, $G_8$) is held reset. Thus, the motor is stopped and the output of the gate $G_{23}$ changes to H and the light emitting diode $LED_2$ is lit to alarm the end of the rewind. If the rewind lever is set to the rewind position without depressing the rewind button, the output of the gate $G_{16}$ is L and the output of the gate $G_{17}$ is H. Therefore, the rewind alarm circuit 603 is activated to flash the light emitting diode $LED_2$ to alarm that the rewind is disabled.

In the film rewind operation, the push button switch SW6 is normally off, the flip-flop ($G_{26}$, $G_{27}$) is in the reset state and the transistor $Q_{17}$ is off. When the switch SW6 is kept on and the flip-flop ($G_{26}$, $G_{27}$) is in the set state, the output of the gate $G_{32}$ is L in the rewind operation and the output of the gate $G_{28}$ is also L. Thus, the transistor $Q_{17}$ is off. Accordingly, the motor speed in the rewind operation is at a speed set by the speed change lever.

In the embodiment shown in FIG. 12, the velocity feedback control is effected by detecting the speed by the D.C. tachogenerator in order to control the motor speed constant. However, the present invention is not limited thereto. For example, it is apparent that the velocity feedback control may be effected by known means which pulsatively detects the rotating speed of the motor by a photo-electric device, a magnetic sensor or a mechanical contact. While the present embodiment illustrates analog constant velocity control, this method may require a large heat burden to the power transistors $Q_1$, $Q_2$, $Q_4$ and $Q_7$ which control the motor current depending on the voltage of the power supply $E_B$ and hence the high efficiency heat dissipation of the high power transistors is required. This is troublesome in reducing the size of the camera. In order to resolve the above problem, the transistors $Q_1$, $Q_2$, $Q_4$ and $Q_7$ may be pulsatively turned on and off and an on-off duty factor is controlled by a pulse width modulation technique. As a result, the heat generation is minimized and small size transistors can be used.

Figure 13:
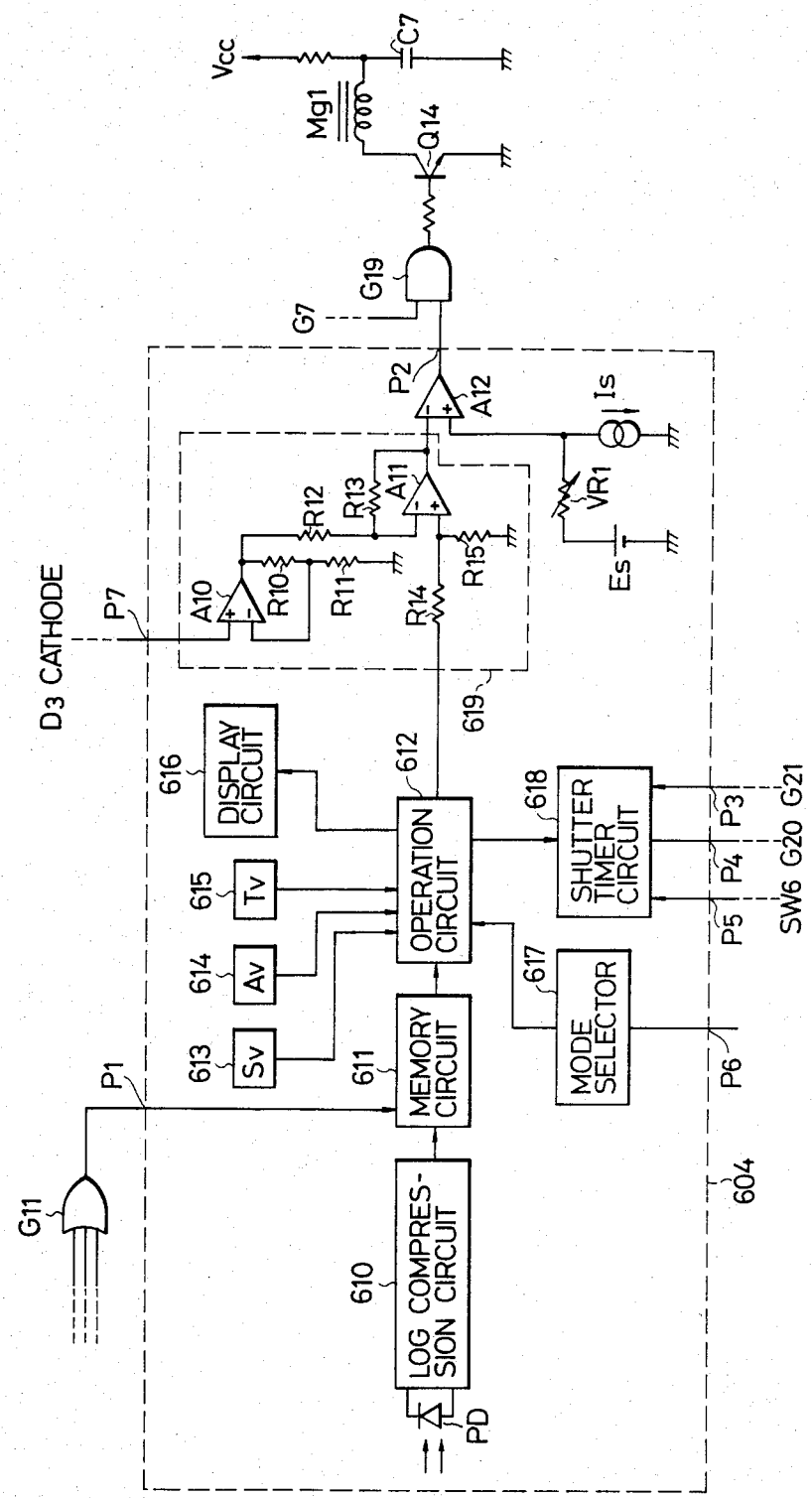
FIG. 13 is a detailed circuit diagram of an exposure control unit of FIG. 12.

FIG. 13 shows an embodiment of the exposure control unit 604 of FIG. 12, particularly a stopping velocity compensation circuit. In FIG. 13, elements similar to those shown in FIG. 12 are designated by the like numerals. A logarithmic compression circuit 610 converts a current measured by a photo-diode PD to a logarithmically compressed voltage. A memory circuit 611 stores an output of the logarithmic compression circuit 610 when the H-output of the OR gate $G_{11}$ is supplied through the terminal $P_1$. An arithmetic circuit 612 receives the outputs of the memory circuit 611, a film sensitivity setting circuit 613, a preset aperture value and minimum aperture value detection circuit 614 and a shutter time setting circuit 615 and operates them in accordance with a mode selected by a mode selector 617 and produces a display output of an exposure setting to a display circuit 616, an output to specify a shutter time by a shutter timer circuit 618 and a stop aperture specifying output for the stop control. When the aperture priority AE mode or the manual exposure setting mode is selected, the mode selector 617 produces the H-level output at the terminal $P_6$, and when the programmed AE mode or the shutter priority AE mode is selected, it produces the L-level output. Numeral 619 denotes a stopping velocity compensation circuit which comprises an in-phase amplifier circuit $A_{10}$, $R_{10}$, $R_{11}$ for amplifying the voltage generated by the tachogenerator and supplied through the terminal $P_7$ and a differential amplifier $A_{11}$, $R_{12}$, $R_{13}$, $R_{14}$, $R_{15}$ which receives the controlling stop aperture voltage supplied from the arithmetic circuit 612 and the output voltage of the amplifier $A_{10}$. The controlling stop aperture voltage from the arithmetic circuit 612 increases as a target stop aperture is reduced. Es denotes a reference voltage and $VR_1$ denotes the variable resistor which is linked to the stop control lever, and Is denotes a constant current sink source. The resistance of the resistor $VR_1$ is reduced as the stop aperture is reduced. As a result, a voltage at the junction of the resistor $VR_1$ and the constant current sink source Is increases as the stop aperture is reduced. $A_{12}$ denotes a comparator. When the voltage acorss the resistor $VR_1$ is equal to or higher than the output from the stopping velocity compensation circuit 619, the output of the comparator $A_{12}$ assumes H to produce a stop latch signal at the terminal $P_2$. As the motor speed increases, the output of the stopping velocity compensation circuit 619 decreases below the output of the arithmetic circuit 612. That is, it is corrected in accordance with the motor speed toward the full open position from the target stop aperture of the arithmetic circuit 612. Since the resistor $VR_1$ changes toward the stopped position from the full open position, the stop latch signal of the comparator $A_{12}$ is produced earlier than the resistor $VR_1$ reaches the target stop value produced from the arithmetic circuit 612 as the motor speed increases. The higher the motor speed is, the earlier the stop latch signal is produced. Thus, the delay of the latch of the stop latch mechanism is compensated and the precise stop control is attained.

As described above, in accordance with the present embodiment, means for discriminating the timing of the shutter operation is provided and the positive change of the motor speed is prevented during the time period from the release operation to the shutter operation, and the change of the film feed speed from the very low speed to the high speed is permitted during the preparation period for the next photographing after the shutter operation.

When the film leader is wound up after the film has been loaded or when the film is rewound after the completion of the photographing, a problem of operation noise may arise. Conversely, it may be desired to rapidly wind or rewind the film. Therefore, the speed is variable in order to comply with such a requirement.

In accordance with the present embodiment, since the stopping velocity is suppressed by the speed control of the motor, the stop can be precisely set, and since the motor speed control is linked to the photographing mode selection, missetting of the stop aperture is prevented.

Since the stopping velocity is controlled independently from the film feed speed after the shutter operation, the preparation operation for the next photographing after the current photographing is not unnecessarily slowed down.

While the single motor is used in the present embodiment to drive the respective mechanisms in the camera, the present invention is not limited thereto but it is equally applicable to a camera which drives the mechanisms in the camera by a plurality of motors. For example, where the film is wound by a first motor and the stop and the mirror are driven by a second motor, voltages to be applied to the first and second motors may be independently varied.

We claim:

1. A drive device for a camera comprising:
   (a) an electric motor;
   (b) stop drive means adapted to be driven by said electric motor to change a stop aperture of a lens;
   (c) means for measuring the brightness of a subject to be photographed, and which generates an electric signal when said stop aperture which is changed reaches a predetermined aperture adaptive to the brightness of said subject;
   (d) means for stopping said stop drive means in response to said electric signal;
   (e) film wind-up means adapted to be driven by said electric motor to wind up a film frame by frame; and
   (f) control means for causing said electric motor to make a first rotation to drive said stop drive means prior to exposure of the film and causing said electric motor to make a second rotation to drive said film wind-up means after the exposure of the film, said control means including means for varying the rotating speed of said electric motor for said second rotation and means for adjusting the rotating speed of said electric motor to a determined speed for said first rotation.

2. A drive device according to claim 1, wherein said electric motor rotates in one direction at the time of said first rotation and rotates in the other direction at the time of said second rotation.

3. A drive device for a camera, comprising:
   (a) an electric motor;
   (b) reflecting mirror means which is movable by said electric motor from its position intersecting a light path between a lens and an exposed film to its postion retracted from the light path;
   (c) film wind-up means adapted to be driven by said electric motor to wind up a film frame by frame; and
   (d) control means for causing said electric motor to make a first rotation to drive said mirror means prior to exposure to the film and causing said electric motor to make a second rotation to drive said film wind-up means after the exposure of the film, said control means including means for varying the rotating speed of said electric motor for said second rotation and means for adjusting the rotating speed of said electric motor to a determined speed for said first rotation.

4. A drive device according claim 3, wherein said electric motor rotates in one direction at the time of said first rotation and rotates in the other direction at the time of said second direction.

5. A photographic still camera, comprising:
   (a) electric motor means;
   (b) stop drive means adapted to be driven by said electric motor means to change a stop aperture of a lens;
   (c) means for electrically latching said stop drive means when said stop aperture is changed to a predetermined value;
   (d) wind-up means adapted to be driven by electric motor means to wind up a film frame by frame; and
   (e) control means for controlling said electric motor means, said control means including means for adjusting the rotation speed of said electric motor means to a first constant speed to drive said stop drive means and adjusting the rotation speed to a second constant speed slower than the first constant speed to drive said wind-up means.

6. A photographic still camera according to claim 5, further comprising switch means having a plurality of operation positions including first and second operation positions and adapted to be switchable between said operation positions by an operator, and wherein said adjusting means is adapted to respond to said switch means and to adjust the rotation speed of said electric motor means for driving said wind-up means so that the rotation speed of said electric motor means is controlled to said first constant speed when said switch means is at said first operation position and controlled to said second constant speed when at said second operation position.

7. A photographic camera, comprising:
   (a) electric motor means;
   (b) means adapted to produce a speed signal responsive to the rotating speed of said electric motor means;
   (c) stop aperture driving means shiftable in response to the rotation of said electric motor means so that a stop aperture of a lens may be varied from maximum aperture toward minimum aperture;
   (d) means which stops the shift of said stop aperture driving means when the stop aperture of the lens changes to a given diaphragm value;
   (e) the stop means including means which produces a stop signal before said stop aperture which is changing reaches said given diaphragm value and means which is actuated in response to said stop signal and connects to said stop aperture driving means; and
   (f) the stop signal producing means including compensation means which accelerates the time of generating said stop signal responsive to said speed signal according to the increased rotating speed of said electric motor means.

8. A photographic camera according to claim 7, wherein said stop signal generating means includes means which provide an electric output corresponding to the diaphragm value given by the stop aperture of the lens which is changing, by operably associating with said stop aperture driving means.

9. A photographic camera according to claim 8, wherein said stop signal generating means further includes means adapted to provide a reference output representing said given diaphragm value and means adapted to compare said electric output with said reference output and wherein said compensation means causes the electric level of said reference output to vary in response to said speed signal.

10. A drive device for a camera, comprising:
    (a) an electric motor;
    (b) stop drive means adapted to be driven by said electric motor to change a stop aperture of a lens;
    (c) means for measuring the brightness of a subject to be photographed, and which generates an electric signal when said stop aperture which is changed reaches a predetermined aperture adaptive to the brightness of said subject;
    (d) means for stopping said stop drive means in response to said electric signal;
    (e) film wind-up means adapted to be driven by said electric motor to wind up a film frame by frame;

(f) means for supplying electric power to said electric motor, said electric power supply means including means for switching an average output electric power between a plurality of different values;
(g) control means for causing said electric motor to make a first rotation to drive said stop drive means prior to exposure of the film and causing said electric motor to make a second rotation to drive said film wind-up means after the exposure of the film; and
(h) adjusting means operative to adjust the electric power from said electric power supply means to a predetermined level and supply the same to said electric motor during said first rotation of said electric motor.

11. A photographic camera, comprising:
(a) electric motor means;
(b) a camera housing having a film chamber for receiving a film supply spool and a film take-up spool, the camera housing being provided with a lid member for closing the film chamber;
(c) advancing means adapted to be driven by said electric motor means to feed a film from said supply spool to said take-up spool;
(d) switch means adapted to be operated by an operator for starting the rotation of said electric motor means; and
(e) means for driving said electric motor means in response to said switch means, the driving means causing the electric motor means to rotate during a determined period of time when said film chamber is closed by said lid member and causing the electric motor means to rotate during a period of time shorter than said determined period of time when said lid member is open.

12. A photographic camera according to claim 11, wherein said driving means includes timer means which measures a predetermined time in response to the operation of said switch means and means which stops the rotation of said electric motor means in response to the termination of the measurement by said timer means.

13. A photographic camera according to claim 12, wherein said timer means includes means which changes said predetermined time in association with the rotation speed of said electric motor means.

14. A photographic camera according to claim 11, wherein said driving means includes timer means having a first time counting mode for counting said determined period of time and a second time counting mode for counting said shorter period of time and means for selecting the mode in response to said lid member.

15. A photographic still camera, comprising:
(a) electric motor means;
(b) stop drive means adapted to be driven by said electric motor means to change a stop aperture of a lens;
(c) means for electrically latching said stop drive means when said stop aperture is changed to a predetermined value;
(d) means adapted to be driven by said electric motor means for advancing a film; and
(e) control means for controlling said electric motor means, said control means including means for adjusting the rotation speed of said electric motor means to a first constant speed to drive said stop drive means and adjusting the rotation speed to a second constant speed slower than the first constant speed to drive said advancing means.

16. A photographic camera, comprising:
(a) electric motor means;
(b) a camera housing having a film chamber for receiving a film supply spool and a film take-up spool, the camera housing being provided with a lid member for closing the film chamber;
(c) advancing means adapted to be driven by said electric motor means to feed a film from said supply spool to said take-up spool;
(d) an operation member adapted to be operated by an operator from an initial position to an operated position; and
(e) means for controlling the rotation of said electric motor means in response to said operation member when said lid member is open, the control means including a power supplying circuit adpated to be enabled when said operation member is operated to said operated position for supplying an electric power to said electric motor means and a braking circuit adapted to be enabled when said operation member is returned to said initial position for stopping the rotation of said electric motor means.

17. A photographic camera according to claim 16, further comprising means for limiting the continuous rotation of said electric motor means within a predetermined period of time.

18. A photographic camera according to claim 17, wherein said limiting means includes timer means which measures said predetermined period of time in response to the operation of said operation member and means which enables said braking circuit in response to the termination of the measurement by said timer means.

19. A photographic camera according to claim 18, wherein said timer means includes means which changes said predetermined period of time in association with the rotation speed of said electric motor means.

* * * * *

UNITED STATES PATENT AND TRADEMARK OFFICE
CERTIFICATE OF CORRECTION

PATENT NO. : 4,538,893
DATED : September 3, 1985
INVENTOR(S) : YOSHIYUKI NAKANO, ET AL.

It is certified that error appears in the above-identified patent and that said Letters Patent are hereby corrected as shown below:

```
Column  1, line 14, after  "superior" insert --,--.
Column  6, line 20, change "secter" to --sector--.
Column 10, line 66, change "pushed" to --pushes--.
Column 11, line 10, change "summerized" to --summarized--.
Column 17, line 42, change "affect" to --effect--.
Column 18, line 26, after "influence" delete "to".
Column 22, line  2, after "is" insert --the--.
Column 23, line 35, delete "any times".
Column 24, line 37, change "procedes" to --proceeds--.
           line 51, after "changes" insert --to--.
Column 26, line 19, change "acorss" to --across--.
```

Signed and Sealed this

Nineteenth Day of November 1985

[SEAL]

Attest:

DONALD J. QUIGG

Attesting Officer

Commissioner of Patents and Trademarks